(12) United States Patent
Malinen et al.

(10) Patent No.: US 11,395,150 B2
(45) Date of Patent: Jul. 19, 2022

(54) COORDINATED AND DISTRIBUTED FREQUENCY SEPARATION DURING COEXISTING COMMUNICATION

(71) Applicant: ARRIS Enterprises LLC, Suwanee, GA (US)

(72) Inventors: Jari Malinen, Santa Clara, CA (US); Siby Mathew Tarigopla Pancras, San Jose, CA (US); Dinesh Raman, Fremont, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 114 days.

(21) Appl. No.: 17/014,507

(22) Filed: Sep. 8, 2020

(65) Prior Publication Data

US 2021/0076222 A1    Mar. 11, 2021

Related U.S. Application Data

(60) Provisional application No. 62/898,284, filed on Sep. 10, 2019.

(51) Int. Cl.
*H04W 16/14* (2009.01)
*H04W 40/24* (2009.01)
(Continued)

(52) U.S. Cl.
CPC ............ *H04W 16/14* (2013.01); *H04W 4/80* (2018.02); *H04W 40/244* (2013.01);
(Continued)

(58) Field of Classification Search
CPC ..... H04W 16/14; H04W 4/80; H04W 40/244; H04W 80/02; H04W 84/18; H04W 88/16
(Continued)

(56) References Cited

U.S. PATENT DOCUMENTS 10,630,377 B2 *   4/2020   Cheng ................. H04W 52/242
10,917,164 B2 *   2/2021   Smyth ................. H04B 7/18517
(Continued)

FOREIGN PATENT DOCUMENTS

WO    2012156574 A1    11/2012

OTHER PUBLICATIONS

PCT International Search Report and Written Opinion for corresponding Application No. PCT/US2020/047956, dated Nov. 27, 2020, 7 pages.

*Primary Examiner* — Nghi H Ly
(74) *Attorney, Agent, or Firm* — Steven Stupp; Stewart Wiener

(57) ABSTRACT

An electronic device that coordinates frequencies of coexisting communication protocols is described. During operation, the electronic device may receive messages with beacon information for a communication protocol, where the beacon information is sourced from one or more gateways and is associated with a second electronic device, and wherein the beacon information in a given message includes a frequency of a given beacon and a given received signal strength of the given beacon. Then, the electronic device may provide, from the interface circuit, an instruction addressed to the second electronic device, where the instruction restricts frequencies of beacons from the second electronic device based at least in part on a band of frequencies associated with a second communication protocol used by at least one of the one or more gateways. For example, the instruction may eliminate beacons having one of the beacon frequencies that overlaps the band of frequencies.

20 Claims, 15 Drawing Sheets

(51) Int. Cl.
  *H04W 80/02* (2009.01)
  *H04W 84/18* (2009.01)
  *H04W 88/16* (2009.01)
  *H04W 4/80* (2018.01)

(52) U.S. Cl.
  CPC ........... *H04W 80/02* (2013.01); *H04W 84/18* (2013.01); *H04W 88/16* (2013.01)

(58) Field of Classification Search
  USPC ................ 370/338, 328, 329, 341, 345, 350
  See application file for complete search history.

(56) References Cited

U.S. PATENT DOCUMENTS

| | | |
|---|---|---|
| 2014/0087752 A1 | 3/2014 | Zhu et al. |
| 2015/0133185 A1 | 5/2015 | Chen et al. |
| 2015/0156723 A1* | 6/2015 | Locher .............. H04W 36/0061 370/311 |
| 2016/0198345 A1 | 7/2016 | Fan et al. |
| 2016/0219591 A1 | 7/2016 | Lee et al. |
| 2019/0335445 A1* | 10/2019 | Forenza ................. H04B 7/024 |

* cited by examiner

COORDINATED AND DISTRIBUTED FREQUENCY SEPARATION DURING COEXISTING COMMUNICATION

CROSS REFERENCE TO RELATED APPLICATIONS

This application claims priority under 35 U.S.C. 119(e) to: U.S. Provisional Application Ser. No. 62/898,284, "Coordinated and Distributed Frequency Separation During Coexisting Communication," filed on Sep. 10, 2019, by Jari Malinen, et al., the contents of which are herein incorporated by reference.

This application includes subject matter related to U.S. patent application Ser. No. 16/185,002, entitled "Flexible Gateway for Heterogeneous-Device Management," by Dileepan Narayanan, et al., filed Nov. 8, 2018, the contents of which are herein incorporated by reference.

BACKGROUND

Field

The described embodiments relate to techniques for communication. Notably, the described embodiments relate to techniques for coordinating the frequencies used with different coexisting communication protocols.

Related Art

The increasing capabilities of electronic devices are dramatically changing our lives. For example, the processing and communication capabilities of portable electronic devices, such as cellular telephones, provide users with the capabilities of a handheld computer. In conjunction with expanded networks, such as the cellular-telephone networks and the Internet, these capabilities are allowing individuals to: access vast amounts of information; identify and interact with other people, organizations and governments; access information at arbitrary locations; and/or perform a wide variety of tasks. Collectively, these technologies have resulted in a significant increase in economic activity (such as online financial transactions, which are sometimes referred to as 'ecommerce') and productivity, and enable a host of applications that enhance user experiences and quality of life.

Recently, it has been proposed that further advances can be achieved by enhancing the capabilities of other electronic devices, which are pervasive but largely ignored by most users (such as in appliances, infrastructure, transportation, farming, etc.). Notably, by embedding sensors, actuators and communication capabilities in these 'background' electronic devices, the so-called 'Internet of things' (IoT) can provide a distributed network that facilities the exchange of data, remote sensing and control, and a diverse set of applications that facilitate more direct integration of the physical world into computer-based systems. In principle, the IoT offers the promise of highly automated systems that improve efficiency, enhance accuracy and expand economic activity in a diverse set of markets, such as: smart cities, hospitality, retail, education, housing, and manufacturing.

In practice, there are still obstacles to achieving the goals of the IoT. Notably, the IoT marketplace is diverse, with competing commercial entities offering devices/endpoints, networks, middleware and cloud-based platforms and services. Moreover, the marketplace lacks interoperability standards, which restricts communication and the exchange of data among components in these systems. The resulting lack of coordination can make it difficult to scale IoT systems while maintaining or ensuring quality of service.

Consequently, the IoT remains fragmented and siloed, which forces users to purchase additional dedicated equipment (such as separate gateways for electronic devices from different manufacturers and providers, and/or additional network switches to connect to different cloud-based service providers) in an attempt to build integrated solutions. However, these efforts often result in custom and expensive solutions with redundant equipment and limited flexibility, all of which is frustrating to users and limits market traction of the IoT.

SUMMARY

In a first group of embodiments, an electronic device that coordinates frequencies of coexisting communication protocols is described. This electronic device includes: a network node; an interface circuit that is communicatively coupled to the network node; a processor; and memory that stores program instructions, where, when executed by the processor, the program instructions cause the electronic device to perform one or more operations. Notably, during operation, the electronic device may receive, at the interface circuit, messages with beacon information for a communication protocol sourced from one or more gateways, where the beacon information corresponds to beacons and is associated with a second electronic device, and where the beacon information in a given message may include a frequency of a given beacon and a given received signal strength of the given beacon. Then, the electronic device may provide, from the interface circuit, an instruction addressed to the second electronic device, where the instruction comprises a restriction for causing the electronic device to restrict frequencies of beacons from the second electronic device based at least in part on a band of frequencies associated with a second communication protocol used by at least one of the one or more gateways.

For example, the restriction causes the electronic device to eliminate beacons having one of the beacon frequencies that overlaps the band of frequencies. Note that the communication protocol may include Bluetooth low energy (BLE) and the second communication protocol may include an Institute of Electrical and Electronics Engineers (IEEE) 802.11 communication protocol.

Moreover, the one or more gateways may include an access point or an eNodeB.

Furthermore, the electronic device may provide one or more instructions addressed to the second electronic device, where the one or more instructions may be distributed, e.g., from a coordinating central node, and may include commands to prevent at least one of the gateways and/or the second electronic device from locally selecting and transmitting on an overlapping frequency. Thus, the one or more gateways and/or the second electronic device may locally choose their transmit frequency from a list of channels that the one or more instructions limits into allowed non-overlapping subsets.

Additionally, the electronic device may provide one or more instructions addressed to at least the one of the gateways or the second electronic device, where the one or more instructions may cause the communication protocol or the second communication protocol to be terminated on a current channel and the communication protocol or the second communication protocol may be relocated to another channel.

In some embodiments, the electronic device may provide one or more instructions addressed to multiple instances of the second electronic device, where the one or more instructions cause the multiple instances of the second electronic devices to terminate their communications on their current channels and to relocate the communication protocol or the second communication protocol to other channels where no two channels overlap.

Moreover, the electronic device may provide one or more instructions addressed to multiple instances of the second electronic device, where the one or more instructions cause the multiple instances of the second electronic devices to terminate their communications on their current channels and to relocate the communication protocol or the second communication protocol to other channels where overlap by the multiple instances of the second electronic device on each channel are evenly distributed. Thus, the maximum number of the multiple instances of the second electronic device on a given channel may be minimized. Alternatively, instead of being evenly distributed, the average minimum physical distance of multiple instances of the second electronic device on a given channel may be maximized based at least in part on known or predetermined locations of the multiple instances of the second electronic device.

Another embodiment provides an access point or an eNodeB that performs counterpart operations to those performed by the electronic device in one or more of the preceding embodiments.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a second group of embodiments, an electronic device that selectively filters messages is described. This electronic device includes: a network node; an interface circuit that is communicatively coupled to the network node; a processor; and memory that stores program instructions, where, when executed by the processor, the program instructions cause the electronic device to perform one or more operations. Notably, during operation, the electronic device may receive, at the interface circuit, messages with beacon information for a communication protocol, where the beacon information is sourced from one or more gateways, corresponds to beacons and is associated with a second electronic device, and where the beacon information in a given message may include a frequency of a given beacon and a given received signal strength of the given beacon. Then, the electronic device may obtain a subset of the messages by selectively filtering the messages based at least in part on a filtering criterion. Next, the electronic device may provide, from the interface circuit, the subset of the messages addressed to a third electronic device.

Note that the second electronic device may include a BLE tag. Moreover, the one or more gateways may include an access point or an eNodeB. Furthermore, the communication protocol may include BLE.

Additionally, the filtering criterion may include one or more of: received signal strengths of the beacons, timestamps when the beacons were received, or a location of the second electronic device.

In some embodiments, the second electronic device is different from the third electronic device.

Another embodiment provides an access point or an eNodeB that performs counterpart operations to those performed by the electronic device in one or more of the preceding embodiments.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
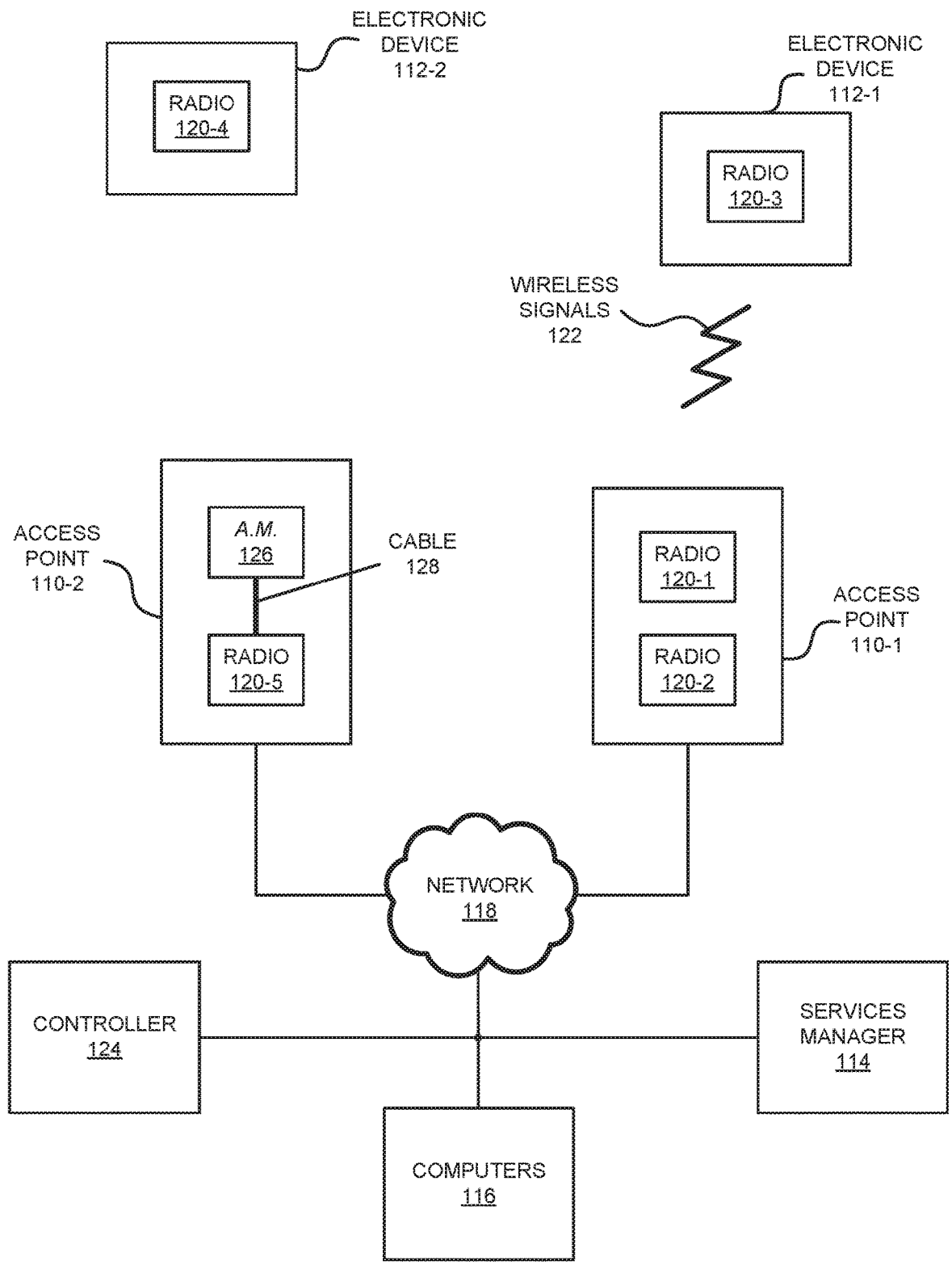
FIG. 1 is a block diagram illustrating an example of communication among electronic devices in accordance with an embodiment of the present disclosure.

In a first group of embodiments, an electronic device that coordinates frequencies of coexisting communication protocols is described. During operation, the electronic device may receive messages with beacon information for a communication protocol (such as BLE), where the beacon information is sourced from one or more gateways (such as access points or eNodeBs), corresponds to beacons and is associated with a second electronic device, and where the beacon information in a given message includes a frequency of a given beacon and a given received signal strength of the given beacon. Then, the electronic device may provide, from the interface circuit, an instruction addressed to the second electronic device, where the instruction comprises a restriction for causing the electronic device to restrict frequencies of beacons from the second electronic device based at least in part on a band of frequencies associated with a second communication protocol used by at least one of the one or more gateways (such as an IEEE 802.11-compatible communication protocol) used by at least one of the gateways. For example, the restriction causes the electronic device to eliminate beacons having one of the beacon frequencies that overlaps the band of frequencies.

By eliminating a beacon frequency that overlaps the band of frequencies (and, more generally, optimizing the use of a band of frequencies for the communication protocol), the communication techniques may reduce interference between the first communication protocol and the second communication protocol. This capability may improve the communication performance of the first communication protocol and the second communication protocol. Consequently, the communication techniques may improve the user experience and may enable the IoT.

In a second group of embodiments, an electronic device that selectively filters messages is described. During operation, the electronic device may receive messages with beacon information for a communication protocol (such as BLE), where the beacon information is sourced from one or more gateways (such as access points or eNodeBs), corresponds to beacons and is associated with a second electronic device, and where the beacon information in a given message includes a frequency of a given beacon and a given received signal strength of the given beacon. Then, the electronic device may obtain a subset of the messages by selectively filtering the messages based at least in part on a filtering criterion. For example, the filtering criterion may include one or more of: received signal strengths of the beacons, timestamps when the beacons were received, or a location of the second electronic device. Next, the electronic device may provide the subset of the messages addressed to a third electronic device.

By communicating the subset of the messages (and, thus, by discarding a remainder of the messages), the communication techniques may reduce communication overhead in a wireless network. This capability may improve the communication performance of the communication protocol. Consequently, the communication techniques may improve the user experience and may enable the IoT.

In the discussion that follows, electronic devices (such as an access point or an eNodeB) communicate frames or packets in accordance with one or more wireless communication protocol, such as an IEEE 802.11 standard (which is sometimes referred to as 'Wi-Fi,' from the Wi-Fi Alliance of Austin, Tex.), Bluetooth (from the Bluetooth Special Interest Group of Kirkland, Wash.), BLE (from the Bluetooth Special Interest Group of Kirkland, Wash.), Zigbee (from the Zigbee Alliance of Davis, Calif.), Z-Wave (from Sigma Designs, Inc. of Fremont, Calif.), LoRaWAN (from the Lora Alliance of Beaverton, Oreg.), Thread (from the Thread Group of San Ramon, Calif.), IPv6 over low-power wireless personal area networks or 6LoWPAN (from the Internet Engineering Taskforce of Fremont, Calif.) and/or another type of wireless interface. In the discussion that follows, Wi-Fi, Zigbee and BLE are used as illustrative examples. However, a wide variety of communication protocols (such as Long Term Evolution or LTE, another cellular-telephone communication protocol, etc.) may be used.

Moreover, the access point or eNodeB may communicate with other access points, eNobdeBs and/or computers in a network using a wired communication protocol, such as an IEEE 802.3 standard (which is sometimes referred to as 'Ethernet'), Message Queueing Telemetry Transport (MQTT) and/or another type of wired interface. In the discussion that follows, MQTT and Ethernet are used as illustrative examples.

FIG. 1 presents a block diagram illustrating an example of communication among one or more access points 110, one or more electronic devices 112 (such as a cellular telephone), a services manager 114, and one or more computers 116 associated with service providers (or third parties, which are sometimes referred to as 'providers') in accordance with some embodiments. Notably, access points 110 may communicate with each other and other components in FIG. 1 using wireless and/or wired communication. Note that access points 110 may include a physical access point and/or a virtual access point that is implemented in software in an environment of an electronic device or a computer. Furthermore, at least some of access points 110 may communicate with electronic devices 112 using wireless communication.

The wired communication among access points 110 and other components (such as services manager 114) may occur via network 118 (such as an intra-net, a mesh network, point-to-point connections and/or the Internet) and may use a network communication protocol, such as Ethernet or MQTT. Moreover, the wireless communication using Wi-Fi or another wireless communication protocol (such as BLE or Zigbee) may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, wireless communication by access points 110 also involves the use of dedicated connections, such as via a peer-to-peer (P2P) communication techniques.

Figure 13:
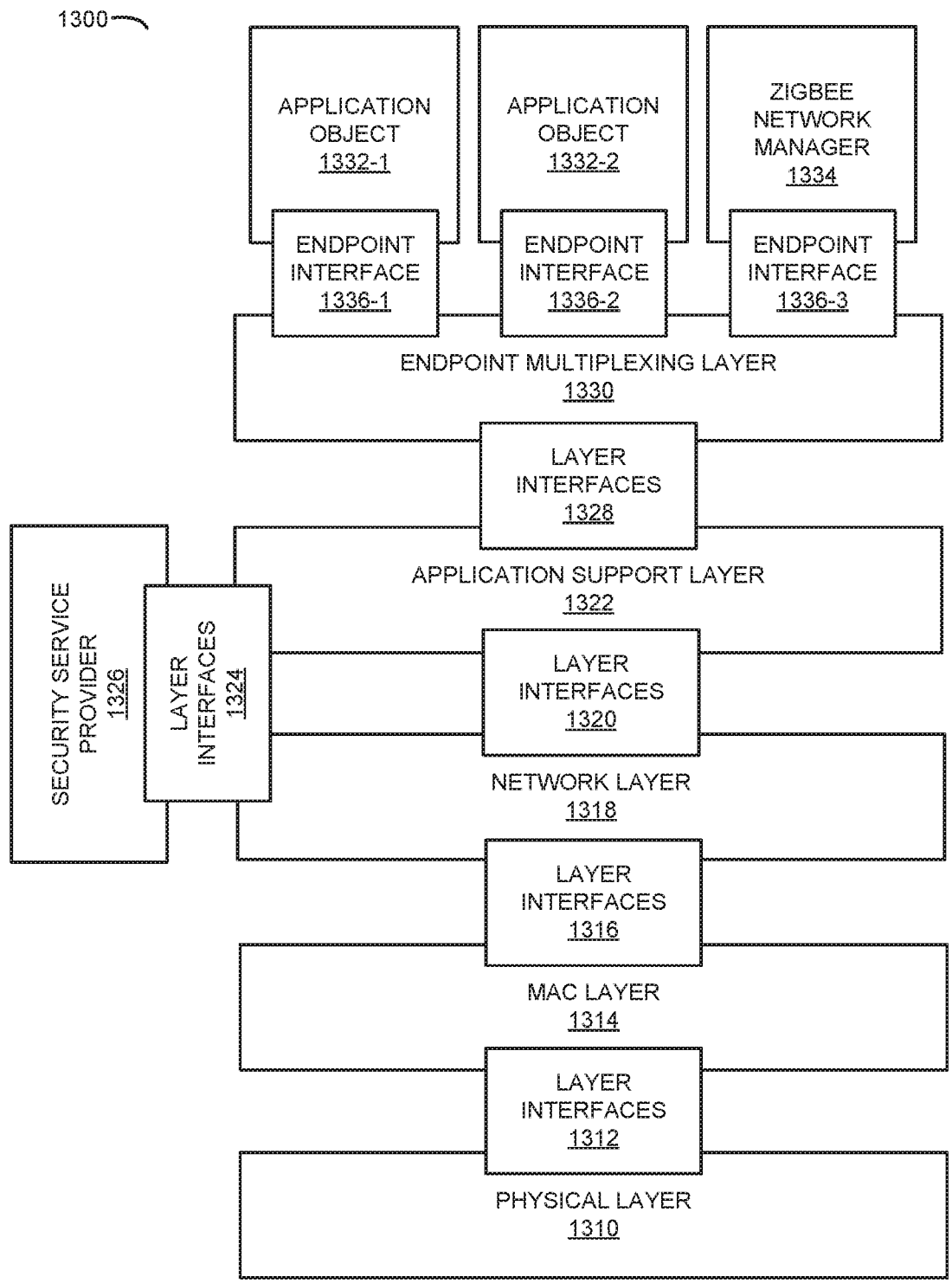
FIG. 13 is a drawing illustrating an example of a services-manager architecture in accordance with an embodiment of the present disclosure.

As described further below with reference to FIG. 13, access points 110, electronic devices 112, services manager 114 and/or computers 116 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120. In some embodiments, such as in access point 110-2, radio 120-5 is coupled to a separate antenna module (A.M.) 126 by a cable 128.

As can be seen in FIG. 1, wireless signals 122 (represented by a jagged line) are transmitted from radios 120-1 and/or 120-2 in access point 110-1. These wireless signals may be received by radio 120-3 in electronic device 112-1. Notably, access point 110-1 may transmit frames or packets. In turn, these frames or packets may be received by electronic device 112-1. Moreover, access point 110-1 may allow electronic device 112-1 to communicate with other electronic devices, computers and/or servers via network 118.

Note that the communication between at least pairs of components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously and as described further below with reference to FIG. 2, one of access points 110 (such as access point 110-1) may perform at least some aspects of the communication techniques. This may allow access points 110 to become one-touch points of access to the IoT using a single framework. Notably, access points 110 may facilitate the dynamic integration of multiple electronic devices and service providers in a variety of applications, as well as easy deployment and upgrades.

In some embodiments, access point 110-1 may provide co-existing or concurrent communication using different communication protocols. Notably, access point 110-1 may include radio 120-1 and/or 120-2. These radios may, respectively, communicate using different communication protocols in a shared band of frequencies (such as the 2.4 GHz ISM band of frequencies). For example, radio 120-1 may be a BLE radio and radio 120-2 may be a Wi-Fi radio (or vice versa). During operation, radio 120-2 may perform a scan of available channels in the shared band of frequencies. Radio 120-2 may detect or determine that BLE and Wi-Fi may each use one of primary channels 1, 6 and 11 (such as channel 1). Alternatively, radio 120-2 may receive, from radio 120-1 (if access point 110-1 includes radio 120-1), information specifying one or more used channels in the shared band of frequencies that are reserved or used by the BLE communication protocol. Next, radio 120-2 may mask the one or more used channels from the available channels (such as by masking out 8-16 MHz corresponding to primary channel 1), and radio 120-2 may select one or more channels from remaining available channels for use with the Wi-Fi communication protocol, such as a new primary channel. Thus, because Wi-Fi has the ability to hop among different channels while BLE and Zigbee typically do not hop, channel masking may be used to facilitate co-existing and/or concurrent communication among access points 110 and electronic devices 112 using two different communication protocols in the shared band of frequencies.

While access point 110-1 is illustrated with separate radios 120-1 and 120-2, in some embodiments these radios are combined into a single radio or integrated circuit. Alternatively or additionally, packet-traffic arbitration between radios 120-1 and 120-2 may be used. Notably, when one of the radios is transmitting or receiving using a channel and a first communication protocol, it may communicate a hold (such as a hold signal or instruction) to the other radio, so that the other radio temporarily does not communicate using the channel and a second communication protocol.

In some embodiments, additional communication capability is added to access point 110-1 via a plug-in module, such as a dongle (which is sometimes referred to as a 'USB dongle') that is inserted into a USB port in access point 110-1. For example, radio 120-1 may be a USB dongle that adds BLE communication capability to access point 110-1. In conjunction with software on access point 110-1, this may enable communication-protocol recognition and translation, as well as communication via another communication protocol (as was just described).

Moreover, as described further below with reference to FIGS. 3 and 4, additional infrastructure may perform or implement at least some aspects of the communication techniques. Notably, services manager 114 may enable dynamic integrated solutions with disparate (and otherwise potentially incompatible) components, such as one or more sensors (which are sometimes referred to as an 'IoT device') and/or actuators from different manufacturers (which are sometimes referred to as an 'IoT device'), and/or one or more service providers. These different components may be associated with different (unrelated) entities, such as different companies or organizations. Note that in the present discussion an 'IoT device' may have a sensing capability and/or an actuation capability.

Notably, services manager 114 may include: a gateway that communicates with one or more of access point 110 via a communication protocol (such as MQTT); a control and management plane with system-configuration information; and a data plane with a registry of the one or more electronic devices 112, rules for the one or more electronic devices 112, and application programming interfaces (APIs) for service providers. Services manager 114 may provide a programmable, modular and integrated system for flexibly and securely exchanging data and associated services among access points 110, electronic devices 112, services manager 114 and computers 116. Note that resources in services manager 114 that are associated with different service providers may be contained in separate virtual machines. Alternatively or additionally, the resources from different service providers may be included in 'containers' (such as docker containers). Furthermore, the control and management plane and the data plane may be implemented in separate software stacks in services manager 114.

In some embodiments, optional controller 124 is used to configure settings of access points 110, such as transmit power, a transmit antenna pattern, a receive antenna pattern, etc. Thus, controller 124 may provide Wi-Fi control and management planes. Moreover, controller 124 may initialize IoT services that are facilitated and managed by services manager 114, i.e., services manager 114 may provide IoT data plane and control and management plane. In addition, services manager 114 may provide a partner portal for Wi-Fi and IoT management by one or more of computers 116. Note that in some embodiments, controller 124 may be combined with services manager 114 in a single device. Furthermore, note that controller 124 and/or services manager 114 may be local devices where access points 110 and electronic devices 112 are installed and used, or may be at a remote location (such as a cloud-based implementation).

In these ways, the communication techniques may enable the IoT. Notably, access points 110 and services manager 114 may provide a single-access network for Wi-Fi and IoT traffic. Access points 110 and services manager 114 may: manage network across different physical layers, provide IoT device-to-backend management, and/or distributed decision-making (such as at the edge immediately behind a firewall versus backend processing). Moreover, access points 110 and services manager 114 may be: transport protocol agnostic, architecture agnostic to the transport layer, and/or may support a variety of communication or transport protocols, such as Zigbee, BLE and/or other IoT communication protocols. Furthermore, access points 110 and services manager 114 may: provide a network backbone for a variety of services, enable end-to-end services for multiple connected ecosystems, and/or provide end-to-end solutions with a simplified value chain and a single network.

Moreover, the communication techniques may allow access points 110 and/or services manager 114 to provide flexible and secure exchange of data and the associated services. For example, the communication techniques may remove siloes between components from different manufacturers and providers (such as local electronic devices that provide IoT devices and actuators and service providers), and may facilitate dynamic services for customers (such as services that are configured and provided as needed). Furthermore, services manager 114 may facilitate interoperability of disparate components from different manufacturers and providers without requiring a standard or retrofitting of legacy equipment. Additionally, services manager 114 may eliminate the need for additional (and expensive) dedicated equipment (such as separate gateways for electronic devices from different manufacturers and/or additional network switches to connect to different cloud-based service providers). Thus, services manager 114 may enable integrated solutions and the IoT, which may allow a wide variety of valued-added applications and services, enhanced economic activity and enhanced user experiences and customer satisfaction.

Figure 7:
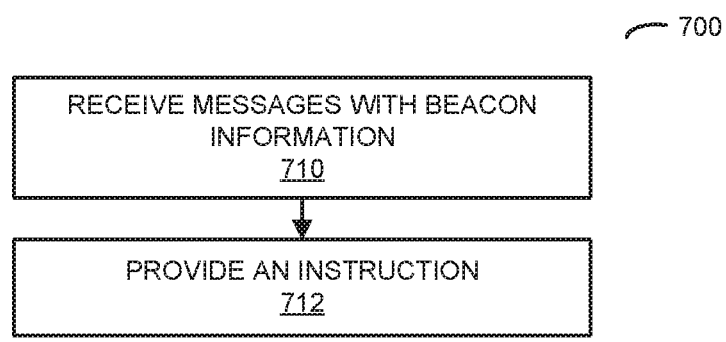
FIG. 7 is a flow diagram illustrating an example of a method for coordinating frequencies of coexisting communication protocols in accordance with an embodiment of the present disclosure.

Furthermore, as described further below with reference to FIGS. 7-9, services manager 114 may coordinate frequencies of coexisting communication protocols, such as BLE and Wi-Fi. Notably, one or more gateways in one or more access points 110 may receive beacons from one or more of electronic devices 112 (such as electronic device 112-1). Subsequently, the one or more access points 110 may provide messages (such as summary reports) with beacon information to services manager 114. For example, the beacon information in a given message may include a frequency of a given beacon and a given received signal strength (such as the RSSI) of the given beacon at a BLE gateway. Moreover, services manager 114 may have access to (e.g., via information stored in a data structure) or may receive from the one or more access points 110 information specifying at least portions of one or more bands of frequencies used during Wi-Fi communication by one or more gateways in the one or more access points 110 (such as a 20 MHz channel in a 2.4 or 5 GHz band of frequencies). Based at least in part on overlap of the used frequency spectrum (such as occurrence of a first frequency of a first beacon in a portion of the one or more bands of frequencies used for Wi-Fi communication), services manager 114 may provide, via at least one of access points 110, an instruction to at least electronic device 112-1 that restricts the frequencies of the beacons (such as instructing electronic device 112-1 to cease using the first frequency, e.g., to only use two beacon frequencies that are outside of the portion of the one or more bands of frequencies).

Additionally, as described further below with reference to FIGS. 10-12, services manager 114 may selectively filter messages. Notably, one or more gateways in one or more access points 110 may receive beacons from one or more of electronic devices 112 (such as electronic device 112-1, which may be a BLE tag). Subsequently, the one or more access points 110 may provide messages with beacon information to services manager 114. For example, the beacon information in a given message may include a frequency of a given beacon and a given received signal strength (such as the RSSI) of the given beacon at a BLE gateway. Moreover, services manager 114 may optionally aggregate the beacon information from the one or more access points 110. Then, services manager 114 may optionally rank the beacon information (such as based on RSSI). Next, services manager 114 may obtain a subset of the messages by selectively filtering the messages based at least in part on a filtering criterion. For example, the filtering criterion may include one or more of: RSSIs of the beacons, timestamps when the beacons were received, or a location of electronic device 112-1. Furthermore, services manager 114 may provide the subset of the messages addressed to a third electronic device, such as another one of electronic devices 112 or one of computer 116. In general, the third electronic device may be different from electronic device 112-1 that provides the beacons.

While the communication techniques in FIG. 1 are illustrated using access points 110 and services manager 114, in other embodiments at least some of the access points 110 may be eNodeBs (not shown). Moreover, an eNodeB may communicate with at least one of access points 110, e.g., using an LTE-WLAN aggregation (LWA) communication protocol.

We now further describe embodiments of access points 110 and services manager 114. Current IoT-device gateways often operate within closed proprietary ecosystems, which can make it difficult to integrate a wide array of management platforms and disparate IoT-device networks. These problems are typically compounded by architectural limitations. For example, the gateways may have monolithic non-modular architectures that often are not scalable and customizable for different IoT-device network deployment scenarios, and these gateways are usually tied to expensive purpose-built hardware.

In order to address these challenges, access points 110 may aggregate and disburse data across disparate IoT devices, and may include data-acquisition and data transformation capabilities (such as a data acquisition and transformation engine or control logic). In addition, services manager 114 may include: a gateway abstraction service, an internal software development kit (SDK) that allows management of a control and management plane, and/or a partner services SDK that allows partner services providers to manage contained resources in services manager 114 that are associated with the respective partner services providers. Note that communication between services manager 114 and access points 110 may use a communication protocol, such as MQTT.

Figure 2:
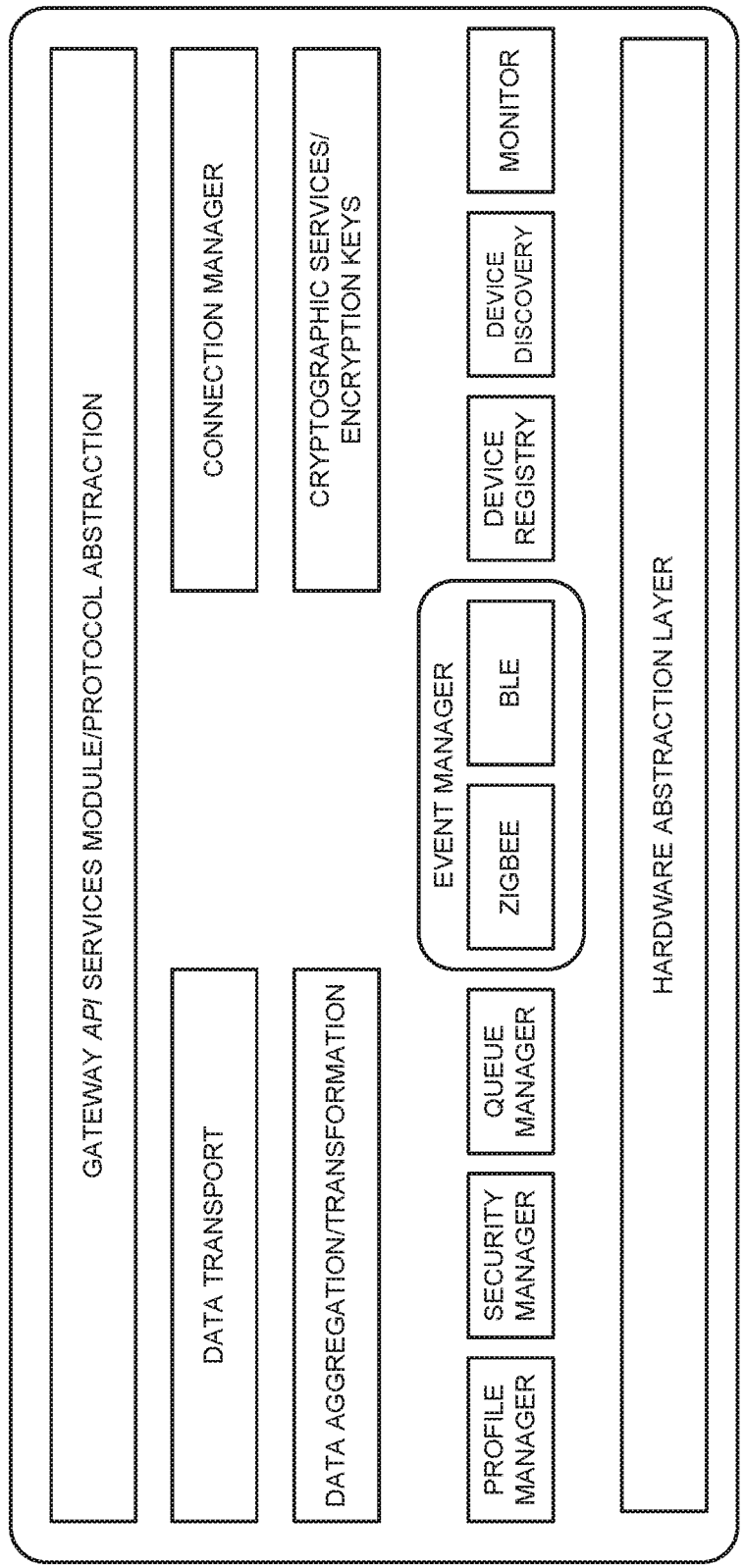
FIG. 2 is a drawing illustrating an example of functionality of an access point in FIG. 1 in accordance with an embodiment of the present disclosure.

FIG. 2 presents a drawing illustrating an example of functionality of an access point 200, such as access point 110-1 in FIG. 1. Access point 200 may include an embedded IoT gateway and may provide an IoT-device management platform that is programmable and that can be easily integrated with existing management solutions. The core gateway functions in access point 200 may include: different communication-protocol stacks, a hardware for communication-protocol abstraction (which can provide a unified view of IoT devices to management platform), data acquisition (such as data aggregation and transformation), prioritization (data/traffic prioritization), management (which can access and set an electronic-device configuration), security (secure electronic-device authentication/actuation and cryptographic services, such as storing one or more encryption keys associated with particular electronic devices), data transport (such as MQTT), a connection manager and/or a gateway API services module and communication-protocol abstraction. In addition, access point 200 may include: an event manager core application (for different communication protocols, such as Zigbee or BLE), a profile manager for the different communication protocols, a security manager, a queue manager, an electronic-device registry, electronic-device discovery and/or a monitor that ensures safe and appropriate operation (such as by detecting an anomaly), and that tracks communication performance, etc.

In some embodiments, access point 200 may include a trusted secure element, WLAN firmware, an IoT gateway engine or control logic (such as one or more physical layer communication protocols) and an application layer that translates between different communication protocols. Note that a given access point may provide at least one communication protocol (in addition to Wi-Fi) via a USB dongle, and groups of access points may be interleaved to provide multiple different communication protocols.

After receiving information (such as IoT-device data or data traffic) from one or more of electronic devices 112 in FIG. 1, access point 200 may translate, into a unified format, the information associated with the one or more electronic devices 112, which may have been received by access point 200, at an interface circuit in access point 200, using different communication protocols. Then, access point 200 may send or communicate the translated information in a unified and consistent manner to a services manager, such as services manager 114 (FIG. 1). For example, access point 200 may provide, from an interface circuit in access point 200, the translated information for one or more additional electronic devices (such as services manager 114 in FIG. 1) using another communication protocol, such as MQTT.

In some embodiments, access point 200 (or services manager 114 in FIG. 1) may provide security by selectively including communication with an electronic device (such as electronic device 112-1 in FIG. 1) in an inclusion list and/or by selectively excluding communication with another electronic devices (such as electronic device 112-2 in FIG. 1) in an exclusion list. For example, the black and/or white lists may be applied by access point 200 following a scan.

Figure 3:
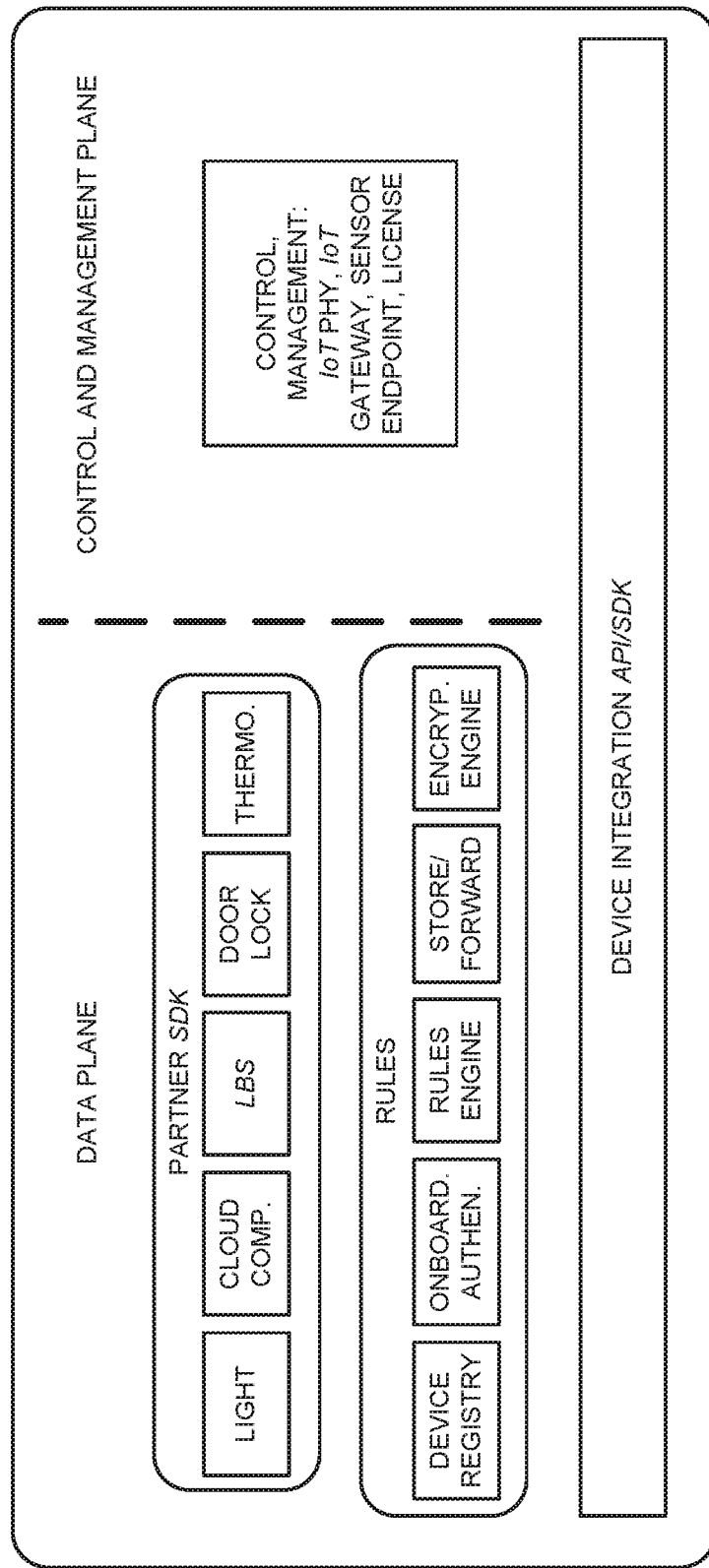
FIG. 3 is a block diagram illustrating an example of an Internet-of-Things (IoT) services manager of FIG. 1 in accordance with an embodiment of the present disclosure.
Figure 4:
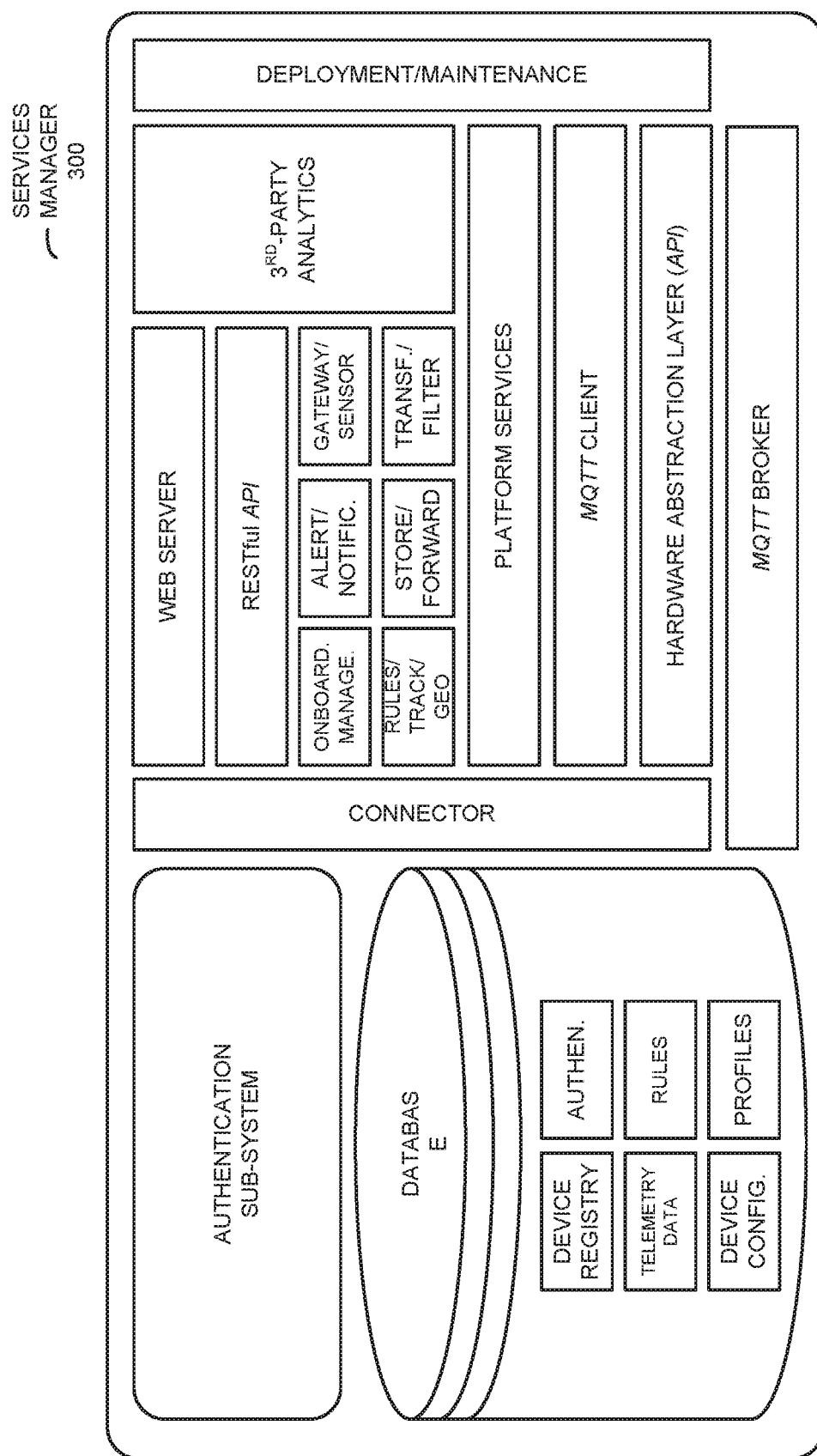
FIG. 4 is a block diagram illustrating an example of a software architecture of the services manager of FIGS. 1 and 3 in accordance with an embodiment of the present disclosure.

FIG. 3 presents a block diagram illustrating an example of a Virtual Internet-of-Things (VIoT) services manager 300, such as services manager 114 in FIG. 1. This services manager may include: a gateway that communicates with one or more access points 110 (FIG. 1) via a communication protocol (such as MQTT); a control and management plane with system-configuration information; and a data plane with a registry of the one or more of electronic devices 112 (FIG. 1), rules for the one or more of electronic devices 112, and APIs for service providers. Services manager 300 may provide a programmable, modular and integrated system for flexibly and securely exchanging data and associated services among access points 110, electronic devices 112, services manager 114 or 300, and computers 116 in FIG. 1. Moreover, resources in services manager 300 that are associated with different service providers may be contained in separate virtual machines. Alternatively or additionally, the resources from different service providers may be included in 'containers,' such as docker containers. Note that a docker container may be a lightweight, stand-alone, executable package of a piece of software that includes everything needed to run it: code, runtime, system tools, system libraries, and settings. The containerized software may run the same, regardless of the environment. Containers also may isolate software from its surroundings, such as differences between development and staging environments, and may help reduce conflicts between different software that is running on the same infrastructure.

As noted previously, services manager 300 may include a control and management plane. The control and management plane may include: control management, an IoT physical layer, a gateway (such as a gateway engine, control logic or module), an IoT-device endpoint, and/or associated licenses. In addition, the control and management plane may provide system-architecture configuration, such as: transmit power, Internet Protocol or IP addresses, etc.

Moreover, services manager 300 may include a data plane with a partner SDK (for applications/services such as: a door lock, a thermostat, a light, analytical services, location-based services or LBS, cloud-based computing, etc.). Furthermore, the data plane may include rules, such as: an electronic-device registry (which may include device-specific information in device profiles), a rules engine or module, onboarding, authentication, an encryption engine or control logic, and store and forward.

Services manager 300 may be a dual-stack, open-programmable, virtualized IoT device-management gateway platform. It may be highly customizable, deployable in multiple network topologies, and may be integrated with existing management networks. The dual-stack, open-programmable, virtualized IoT device-management gateway platform may be an enterprise-grade IoT device-management platform. Note that services manager 300 may be a policy-driven virtualized wireless gateway that manages an IoT device network that includes one or more types of IoT devices from one or more manufacturers, and which may use different communication protocols. The open framework may facilitate IoT-device management in separate virtual machines, which may offer different vertical services.

In some embodiments, access point 200 (FIG. 2) and/or services manager 300 addresses a typical IoT device-network management system, which may include: wireless IoT devices, a physical communication layer, a network connectivity/protocol layer, and/or a gateway layer. Notably, access point 200 (FIG. 2) may include a data acquisition layer. For example, a data acquisition engine or control logic may enable gateway communication at scale with many IoT devices using disparate IoT-device connectivity or communication protocols (such as BLE, Zigbee, Z-Wave, etc.). This data acquisition layer may include the drivers and metadata information used to recognize and communicate with the different IoT-device types using different communication protocols.

Moreover, access point 200 (FIG. 2) may include an aggregation and translation layer. Notably, many of the IoT-device connectivity or communication protocols are rudimentary and fragmented. For example, Zigbee or BLE often does not provide support for IP. The aggregation and translation layer may perform the function of normalizing the data collected across these IoT devices. This block may perform packet processing and encapsulation functions for disparate incoming IoT-device packets and the output of this block may be normalized data in a standard format (such as MQTT) that is recognizable by a programmable application layer.

Furthermore, services manager 300 may include a programmable application layer. Notably, a smart-gateway abstraction service in services manager 300 may provide a full edge analysis engine or module. For example, the programmable application layer may implement blocks and functions, such as: a message broker, a rules engine or module, an onboarding engine or module, an electronic-device registry, a store and forward engine or module, and/or an encryption engine of control logic. Note that this layer may host a runtime environment and/or libraries that enable a third-party IoT SDKs, such as the partner service-provider SDKs. The routing of data packets to different third-parties may be based at least in part on predefined policies specified by a user, such as a customer or a service-provider partner.

Additionally, services manager 300 may include an open management interface layer.

Services manager 300 may be a self-contained virtual machine that includes APIs that enable customers and/or service-provider partners to add another layer of contextualization/customization based at least in part on specific business needs. This flexibility may make services manager 300 highly programmable and rapidly deployable.

Note that services manager 300 may be architected as a dual-stack gateway. A first stack may include the data acquisition layer and the aggregation and translation layer. As discussed previously, the first stack may physically reside in a wireless access point (such as access point 200 in FIG. 2) and/or in on-premise gateway hardware.

A second stack may include the programmable application layer and the open management interface layer. Note that the second stack is a virtual machine that can reside on any of the wireless gateway hardware, such as access point 200 (FIG. 2), controller 124 (FIG. 1), services manager 300. Thus, the second stack may be on-premise, in a data center or may be cloud-based. Therefore, in general functionality of access point 200 (FIG. 2) and/or services manager 300 may be implemented by an arbitrary component, such as a local or a distributed electronic device or system.

The dual-stack architecture may provide flexibility to be deployed in an arbitrary network topology. In addition, this architecture may enable a distributed gateway architecture.

The core functions of the solution (which is sometimes referred to as an 'IoT gateway') implemented in access point 200 (FIG. 2) and services manager 300 may include: centralized management (secure onboarding management of IoT devices and gateways), data aggregation (aggregate and transform data from multiple gateways), edge analytics (process data at the edge, i.e., behind the firewall, from multiple gateways), hardware abstraction (provide unified view/management of different IoT-device types), and/or rules and alerts (create rules and alerts, predictive analysis, etc.).

The technology and capabilities of the solution implemented in access point 200 (FIG. 2) and services manager 300 may include: self-contained container/virtual machine that can be hosted anywhere (such as a controller, a switch, in the cloud, etc.). Moreover, the solution may have multi-tenants, which provides flexible deployment models and allows the use of a public and/or a private cloud. Furthermore, the solution may have the ability to host $3^{rd}$-party SDKs and may provide a unified view of IoT devices/gateways. Additionally, the solution may incorporate edge computing capabilities (e.g., via a partner SDK and/or internal capability). The solution may be highly modular with a cloud-scale architecture.

In some embodiments, an open, programmable IoT gateway module may be programmed through a multitude of management platforms using one or more interfaces. Moreover, the IoT gateway may be capable of machine learning and intelligent decision making at the edge without back-hauling information to the cloud, e.g., intelligent channel selection and assignment of channels across disparate wireless radios (such as Zigbee, Bluetooth, BLE, Wi-Fi, LoRaWAN, etc.). Furthermore, the IoT gateway may automatically detect anomalies and may dynamically use rules for creation/insertion to suppress anomalies. In addition, the IoT gateway may provide notifications, intelligent tracking and geo fencing of IoT and IoT-device assets. Additionally, the IoT gateway may intelligently identity and classify electronic devices, e.g., learning electronic-device characteristics based at least in part on communication patterns, association patterns, and/or beaconing patterns. These characteristics may be used to assign traffic from an electronic device to a queue with an appropriate queue latency. The IoT gateway may also prioritize electronic devices and/or electronic-device categories based at least in part on the learned characteristics, which may be used to prioritization of messages and/or message categories. In some embodiments, the IoT gateway may guarantee delivery of certain IoT messages, such as based at least in part on prioritization, intelligent classification and/or machine learning FIG. 4 presents a block diagram illustrating an example of a software architecture of services manager 300. Notably, services manager 300 may include: an MQTT broker, a hardware abstraction layer API, an MQTT client, VIoT platform services (such as Java/Python runtime platform services), a gateway/IoT-device onboarding management, alerts/notifications, gateway/IoT-device actions, a rules engine/tracking/geo fencing, store and forward, and/or data transformation and filter. In addition, services manager 300 may include: $3^{rd}$-party edge analytics, a RESTful API (which uses HTTP requests to GET, PUT, POST and DELETE data) for provisioning, actuation, statistics aggregation and management, a web server, an authentication subsystem, and/or a database. The $3^{rd}$-party edge analytics may interface to external analytics services, the Web server may interface to one or more external cloud-based components, partner management portals, dashboard services and/or mobile applications. Note that the database may include information, such as: an electronic-device registry, telemetry data, electronic-device configuration, authentication, rules and/or profiles (e.g., electronic-device characteristics or device-specific information). In some embodiments, services manager 300 supports blockchain for highly secure environments.

Figure 5:
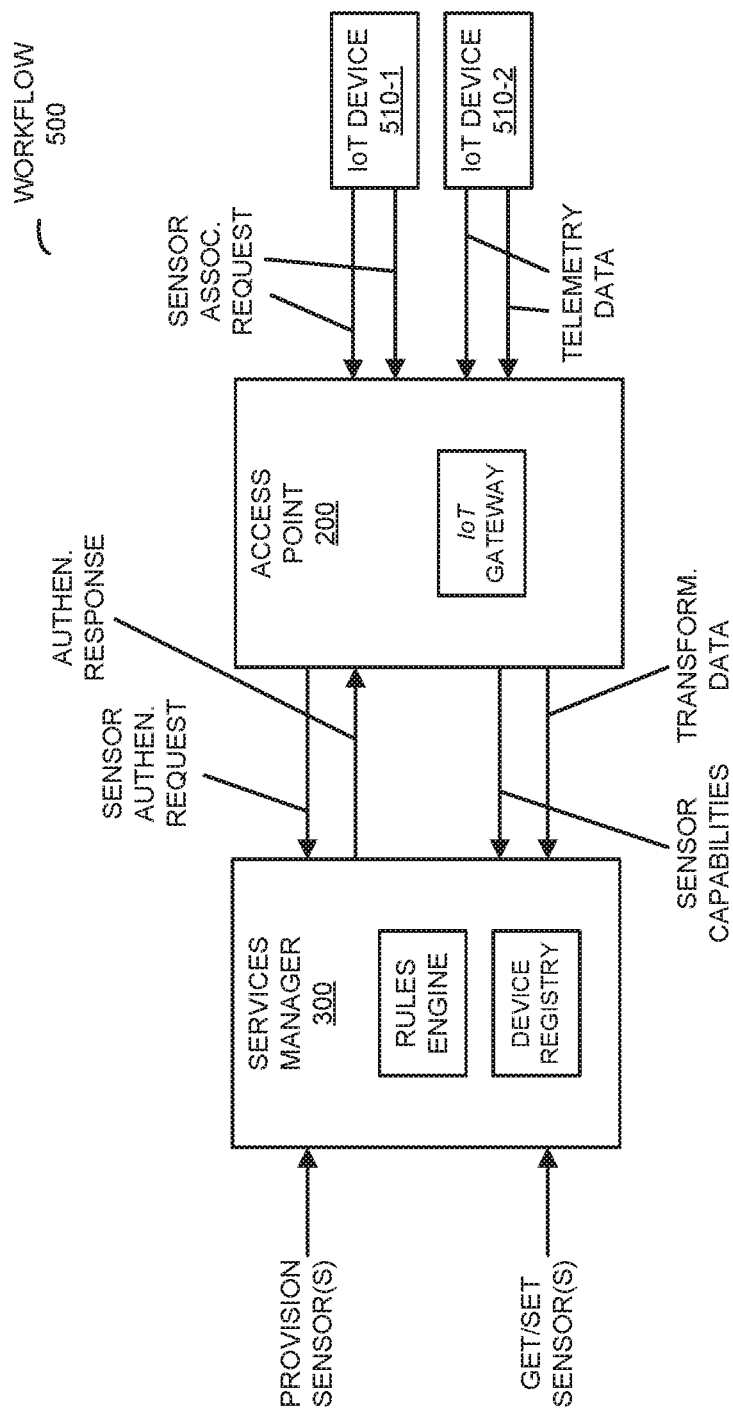
FIG. 5 is a drawing illustrating an example of an onboarding work flow in accordance with an embodiment of the present disclosure.

FIG. 5 presents a drawing illustrating an example of an onboarding work flow 500. Notably, IoT devices may be provisioned via an API call. Then, services manager 300 may create entry in an electronic-device registry. Moreover, one or more of IoT devices 510 may provide an IoT-device associate request to a gateway in access point 200. In response, access point 200 may provide an IoT-device authorization request to services manager 300, and may receive an authorization response. Next, access point 200 may provide information about IoT-device capabilities (and, more generally, characteristics of IoT devices 510). Furthermore, services manager 300 may receive an API call to get or set IoT devices, which may be forwarded to one or more of IoT devices 510. In response, one or more of IoT devices 510 (such as IoT device 510-2) may provide telemetry data. Associated transformed data may be provided by access point 200 to services manager 300. Additionally, services manager 300 may process the transformed data and/or may trigger local rules.

Figure 6:
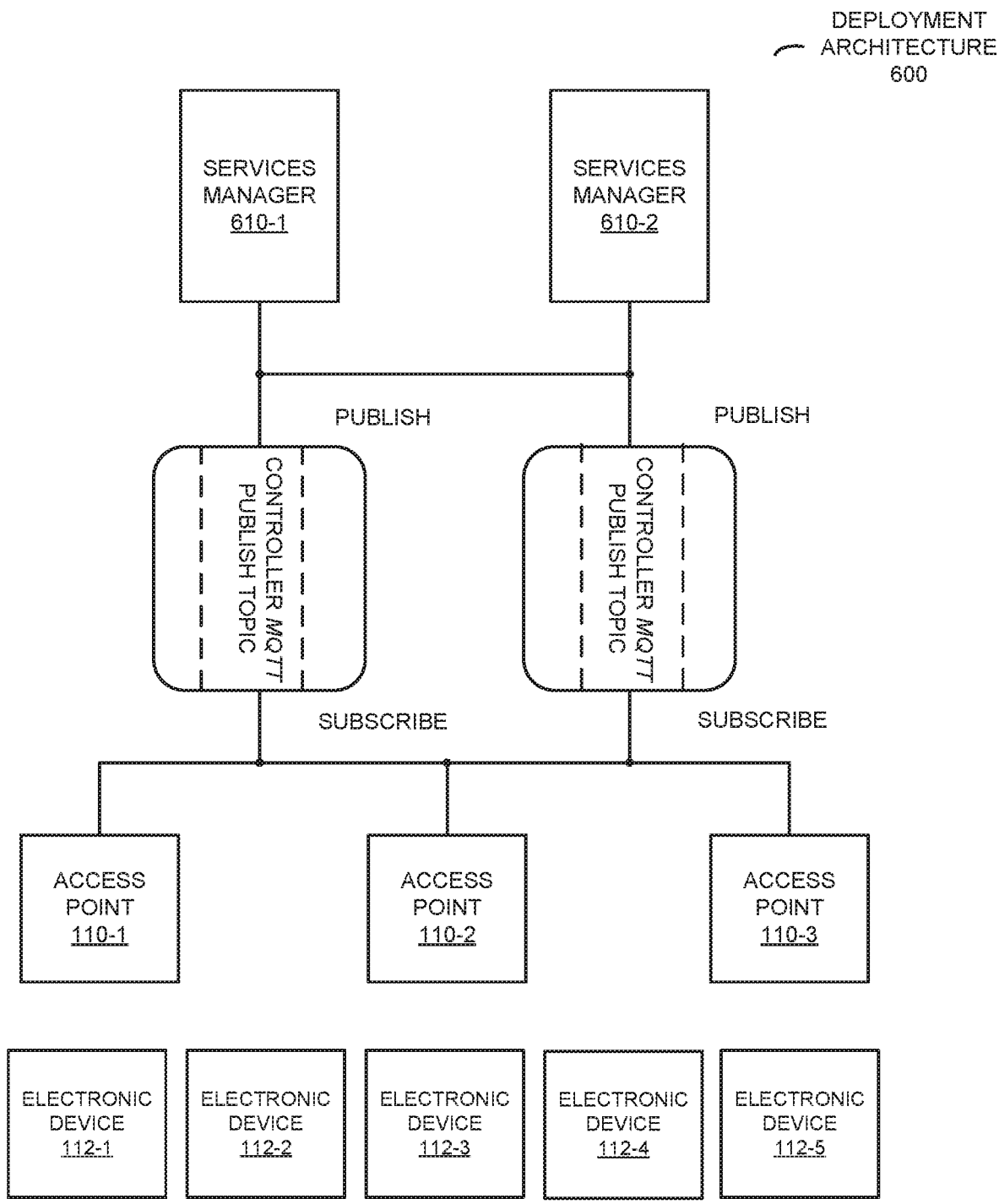
FIG. 6 is a drawing illustrating an example of a deployment architecture in accordance with an embodiment of the present disclosure.

FIG. 6 presents a drawing illustrating an example of a deployment architecture 600. This architecture may include: one or more IoT devices or electronic devices 112 (which may include one or more sensors or sensing capabilities), one or more access points 110 (or gateways), and one or more services managers 610. Services managers 610 may publish or subscribe messages via controller MQTT publish topics. For example, services managers 610 may publish or subscribe messages using channels (which may be static or dynamic) having associated priorities.

Note that a given services manager (such as services manager 610-1) may dynamically configure subdomains in access points 110 and/or electronic devices 112 (FIG. 1) to define a range of communication using a communication protocol, such as MQTT. Alternatively or additionally, the given services manager may dynamically define channels for data traffic with access points 110 and/or electronic devices 112, where the channels are associated with different topics.

While the preceding embodiments illustrate access points 110 and services manager 114 as having particular components and a particular architecture, other embodiments may include fewer or more components, different components and/or a different architecture.

We now describe embodiments of methods associated with the communication techniques. FIG. 7 presents a flow diagram illustrating an example of a method 700 for coordinating frequencies of coexisting communication protocols, which may be performed by an electronic device, such as services manager 114 in FIG. 1. During operation, the electronic device may receive, messages with beacon information (operation 710) for a communication protocol sourced from one or more gateways, where the beacon information corresponds to beacons and is associated with a second electronic device, and where the beacon information in a given message includes a frequency of a given beacon and a given received signal strength of the given beacon. Then, the electronic device may provide an instruction (operation 712) addressed to the second electronic device, where the instruction comprises a restriction for causing the electronic device to restrict frequencies of beacons from the second electronic device based at least in part on a band of frequencies associated with a second communication protocol used by at least one of the one or more gateways.

For example, the restriction causes the electronic device to eliminate beacons having one of the beacon frequencies that overlaps the band of frequencies. Note that the communication protocol may include BLE and the second communication protocol may include an IEEE 802.11 communication protocol.

Moreover, the one or more gateways may include or may be included in an access point or an eNodeB.

Furthermore, the electronic device may provide one or more instructions addressed to the second electronic device, where the one or more instructions may be distributed, e.g., from a coordinating central node, and may include commands to prevent at least one of the one or more gateways and/or the second electronic device from locally selecting and transmitting on an overlapping frequency. Thus, the one or more gateways and/or the second electronic device may locally choose their transmit frequency from a list of channels that the one or more instructions limits into allowed non-overlapping subsets.

Additionally, the electronic device may provide one or more instructions addressed to at least the one of the gateways or the second electronic device, where the one or more instructions may cause the communication protocol or the second communication protocol to be terminated on a current channel and the communication protocol or the second communication protocol may be relocated to another channel.

In some embodiments, the electronic device may provide one or more instructions addressed to multiple instances of the second electronic device, where the one or more instructions cause the multiple instances of the second electronic devices to terminate their communications on their current channels and to relocate the communication protocol or the second communication protocol to other channels where no two channels overlap.

Moreover, the electronic device may provide one or more instructions addressed to multiple instances of the second electronic device, where the one or more instructions cause the multiple instances of the second electronic devices to terminate their communications on their current channels and to relocate the communication protocol or the second communication protocol to other channels where overlap by the multiple instances of the second electronic device on each channel are evenly distributed. Thus, the maximum number of the multiple instances of the second electronic device on a given channel may be minimized. Alternatively, instead of being evenly distributed, the average minimum physical distance of multiple instances of the second electronic device on a given channel may be maximized based at least in part on known or predetermined locations of the multiple instances of the second electronic device.

Figure 8:
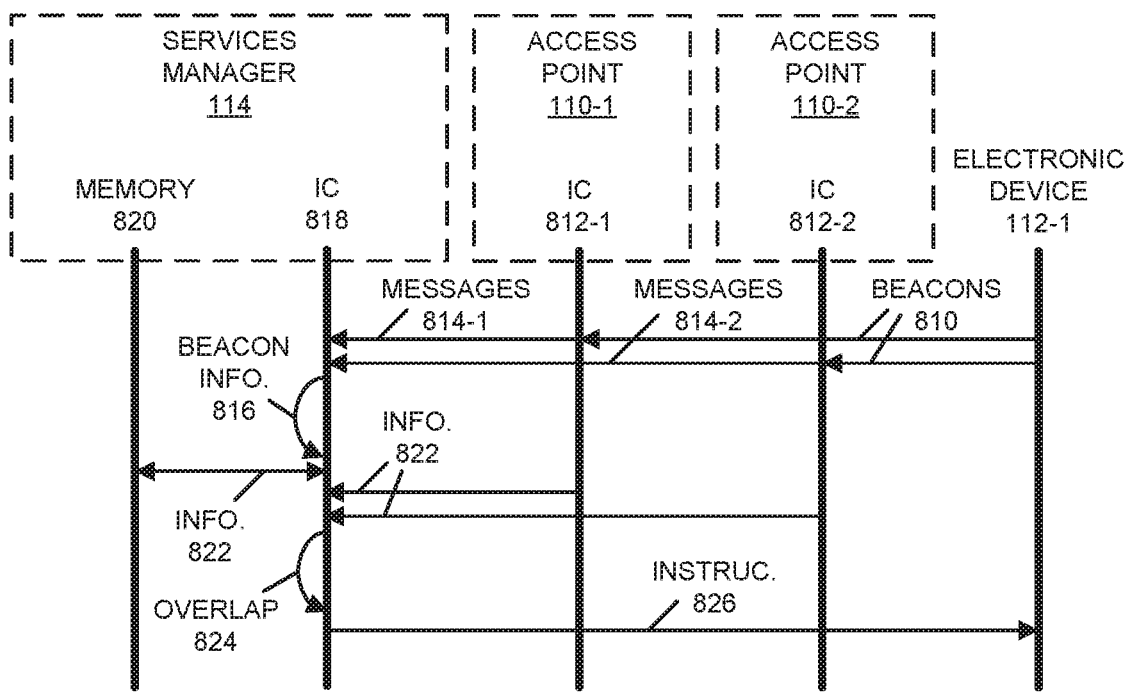
FIG. 8 is a drawing illustrating an example of communication among the electronic devices in FIG. 1 in accordance with an embodiment of the present disclosure.

Embodiments of the communication techniques are further illustrated in FIG. 8, which presents a drawing illustrating an example of communication among electronic device 112-1, access points 110 and services manager 114. Notably, electronic device 112-1 may transmit beacons 810 having frequencies (such as carrier frequencies). For example, a given beacon transmitted by electronic device 112-1 may have a given frequency. In some embodiments, three frequencies may be used.

Interface circuit 812-1 in access points 110-1 and interface circuit 812-2 in 110-2 may receive beacons 810. Then, interface circuits 812-1 and 812-12 may, respectively, provide messages 814-1 and 814-2 to services manager 114. These messages may include beacon information 816. For example, the beacon information in a given message may include a frequency of a given beacon and a given received signal strength (such as the RSSI) of the given beacon at a given access point.

After receiving messages 814, interface circuit 818 in services manager 114 may extract beacon information 816. Then, interface circuit 818 may access in memory 820 in services manager 114 information 822 specifying at least portions of one or more bands of frequencies used during Wi-Fi communication by access points 110-1 and 110-2 (such as a 20 MHz channel in a 2.4 or 5 GHz band of frequencies). Alternatively, interface circuits 812-1 and 812-2 may provide information 822 to services manager 114 (e.g., in one or more packets or frames).

Next, interface circuit 818 may compare beacon information 816 and the portion of the one or more bands of frequencies to determine overlap 824 of used frequency spectrum (such as occurrence of a first frequency of a first beacon in a portion of the one or more bands of frequencies used for Wi-Fi communication). Moreover, based at least in part on overlap 824, interface circuit 818 may provide an instruction 826 to electronic device 112-1 that restrict the frequencies of beacons 810 to eliminate overlap 824. For example, instruction 826 may indicate that electronic device 112-1 cease using the first frequency, such as only using two beacon frequencies that are outside of the portion of the one or more bands of frequencies.

Figure 9:
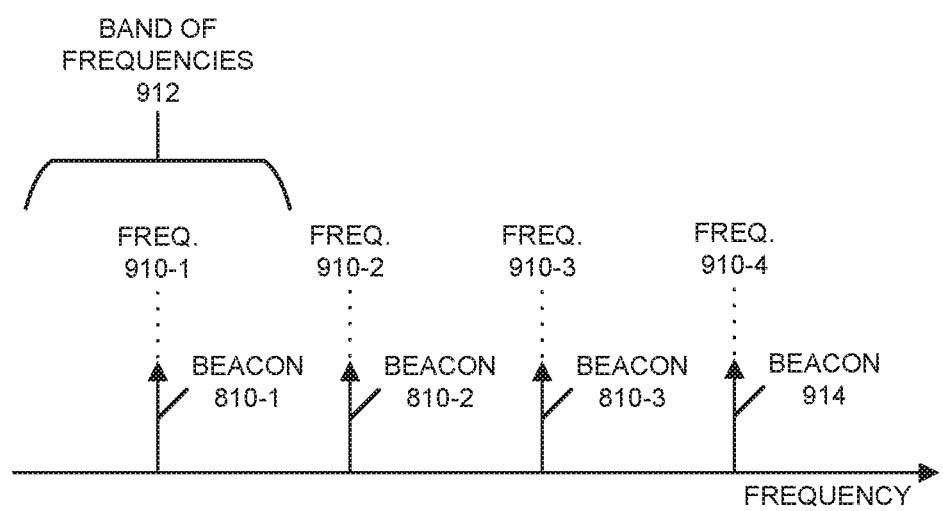
FIG. 9 is a drawing illustrating an example of coordinating frequencies of coexisting communication protocols in accordance with an embodiment of the present disclosure.

FIG. 9 presents a drawing illustrating an example of coordinating frequencies of coexisting communication protocols in accordance with an embodiment of the present disclosure. Notably, beacons 810 (such as BLE beacons) provided by an electronic device may initially have frequencies 910. However, frequency 910-1 may overlap with or occur in a portion of a band of frequencies 912 that is used, e.g., by Wi-Fi communication with an access point. Consequently, the electronic device may be instructed to cease using frequency 910-1. For example, the electronic device may only use frequencies 910-2 and 910-3 or may use frequencies 910-2, 910-3 and 914 (i.e., frequency 914 may be used instead of frequency 910-1).

In this way, the communication techniques may eliminate overlap in at least the portion of the band of frequencies 912, which may reduce interference. Thus, the communication techniques may improve communication performance of, e.g., BLE and/or Wi-Fi.

Figure 10:
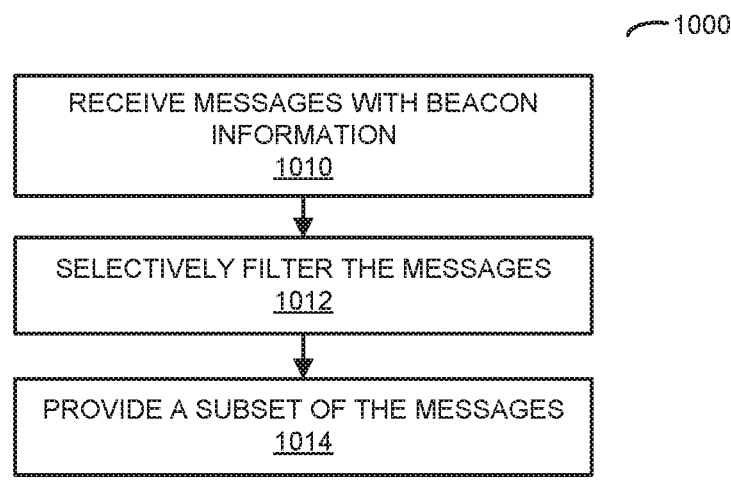
FIG. 10 is a flow diagram illustrating an example of a method for selectively filtering messages in accordance with an embodiment of the present disclosure.

FIG. 10 presents a flow diagram illustrating an example of a method 1000 for selectively filtering messages, which may be performed by an electronic device, such as services manager 114 in FIG. 1. During operation, the electronic device may receive messages with beacon information (operation 1010) for a communication protocol, where the beacon information is sourced from one or more gateways and is associated with a second electronic device, and where the beacon information in a given message may include a frequency of a given beacon and a given received signal strength of the given beacon. Then, the electronic device may obtain a subset of the messages by selectively filtering the messages (operation 1012) based at least in part on a filtering criterion. For example, the filtering criterion may include one or more of: received signal strengths of the beacons, timestamps when the beacons were received, or a location of the second electronic device. Next, the electronic device may provide the subset of the messages (operation 1014) addressed to a third electronic device. In some embodiments, the second electronic device is different from the third electronic device.

Note that the second electronic device may include a BLE tag. Moreover, the one or more gateways may include an access point or an eNodeB. Furthermore, the communication protocol may include BLE.

In some embodiments of method 700 (FIG. 7) and/or 1000 there may be additional or fewer operations. Furthermore, the order of the operations may be changed, and/or two or more operations may be combined into a single operation.

Figure 11:
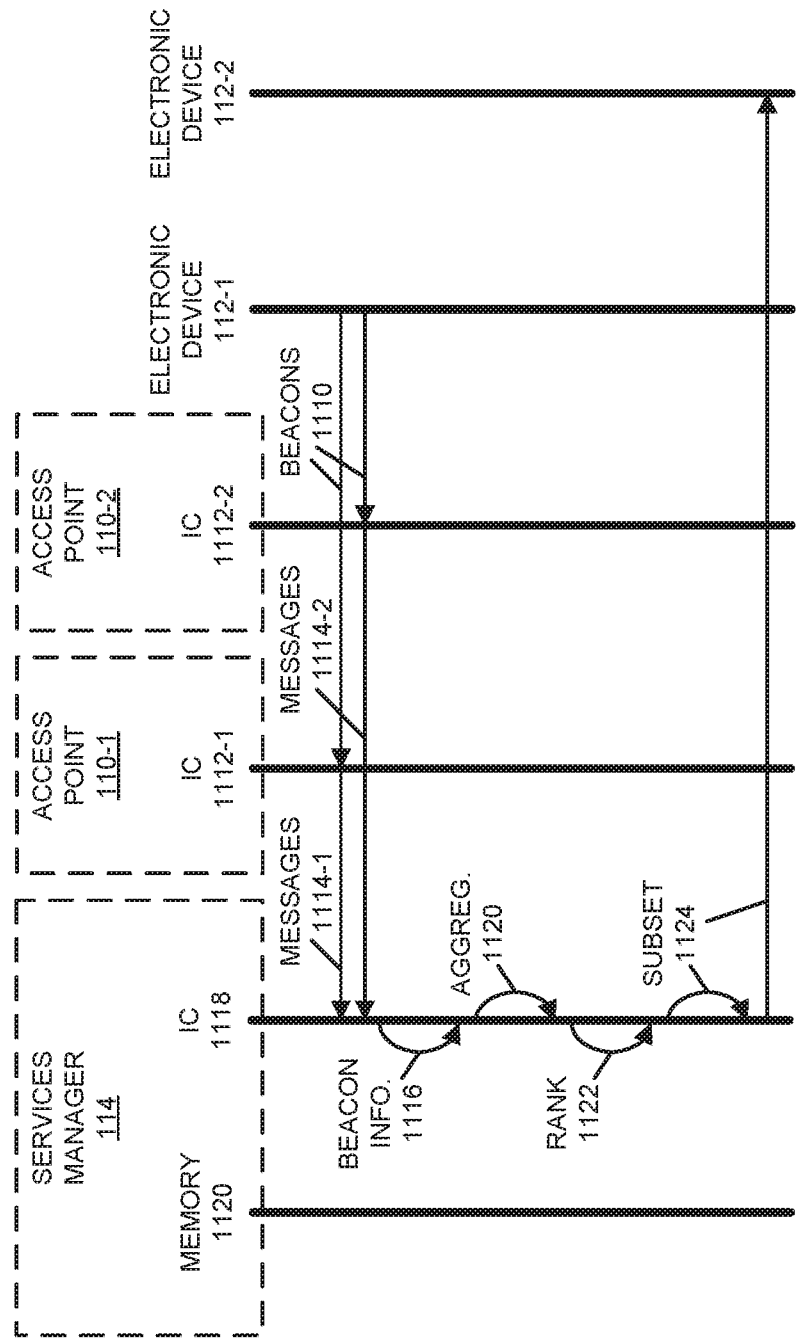
FIG. 11 is a drawing illustrating an example of communication among the electronic devices in FIG. 1 in accordance with an embodiment of the present disclosure.

Embodiments of the communication techniques are further illustrated in FIG. 11, which presents a drawing illustrating an example of communication among electronic device 112-1, electronic device 112-2, access points 110 and services manager 114. Notably, electronic device 112-1 (such as a BLE tag) may transmit beacons 1110 having frequencies (such as carrier frequencies). For example, a given beacon transmitted by electronic device 112-1 may have a given frequency. In some embodiments, three frequencies may be used.

Interface circuit 1112-1 in access points 110-1 and interface circuit 1112-2 in 110-2 may receive beacons 1110. Then, interface circuits 1112-1 and 1112-12 may, respectively, provide messages 1114-1 and 1114-2 to services manager 114. These messages may include beacon information 1116. For example, the beacon information in a given message may include a frequency of a given beacon and a given received signal strength (such as the RSSI) of the given beacon at a given access point.

After receiving messages 1114, interface circuit 1118 in services manager 114 may extract beacon information 1116. Moreover, interface circuit 1118 may optionally aggregate 1120 beacon information 1116 from access points 110 (such as over time or based at least in part on a location of electronic device 112-1) and/or may optionally rank 1122 the beacon information (such as based on RSSI).

Then, interface circuit 1118 may obtain a subset 1124 of the messages by selectively filtering the messages based at least in part on a filtering criterion. For example, the filtering criterion may include one or more of: RSSIs of the beacons 1110, timestamps when beacons 1110 were received by access points 110, or a location of electronic device 112-1. Furthermore, interface circuit 1118 may provide subset 1124 of the messages to electronic device 112-2. Note that electronic device 112-2 may use subset 1124 of the messages to determine a location, such as of electronic device 110-1 or a location of an object or an individual that is proximate to electronic device 110-1.

In this way, the communication techniques may restrict the communication to subset 1124 of the messages that are or interest or that are most-relevant to electronic device 112-2. This capability may reduce communication overhead in a wireless network (such as a WLAN) and may improve communication performance.

While FIG. 11 illustrates communication between components using unidirectional or bidirectional communication with lines having single arrows or double arrows, in general the communication in a given operation in this figure may involve unidirectional or bidirectional communication.

Figure 12:
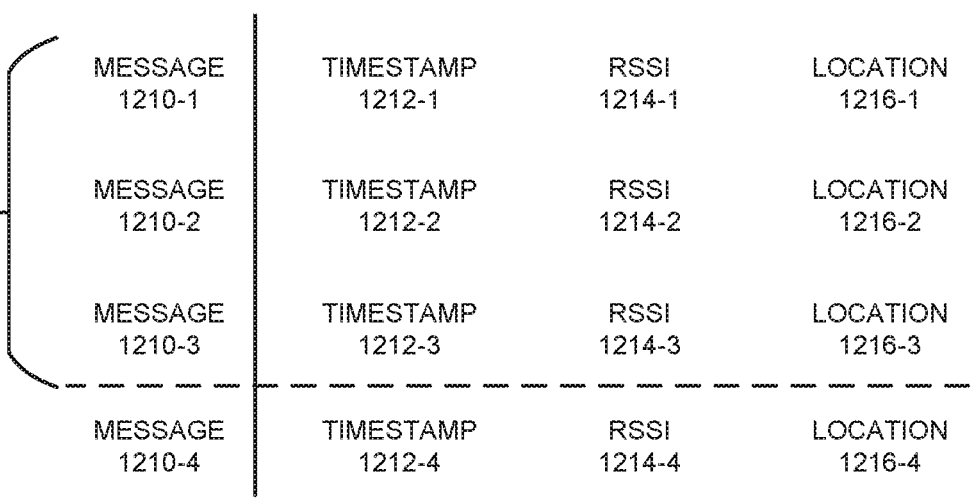
FIG. 12 is a drawing illustrating an example of selective filtering of messages in accordance with an embodiment of the present disclosure.

FIG. 12 presents a drawing illustrating an example of selective filtering of messages in accordance with an embodiment of the present disclosure. Notably, messages 1210 provided by an electronic device may have associated timestamps 1212, RSSIs 1214 and/or locations 1216 (which may be determined by one or more access points that receive messages 1210). Using this information, a services manager may select subset 1218 of messages 1210.

In some embodiments, the communications techniques may be used to separate ZigBee or BLE frequency spectral use from coexisting Wi-Fi communication. This is shown in FIG. 13, which presents a drawing illustrating an example of a services-manager architecture 1300 in accordance with an embodiment of the present disclosure. Notably, this services-manager architecture may include a physical layer 1310 that implements an IEEE 802.15.4 standard (such as ZigBee), which has layer interfaces 1312 (e.g., a physical data service access point or PD-SAP, or a physical layer managed entity SAP or PLME-SAP) to a MAC layer 1314 that implements an IEEE 802.15.4 standard. Moreover, MAC layer 1314 may have layer interfaces 1316 (e.g., a MAC common part layer SAP or MCPS-SAP, or MAC layer managed entity SAP or MLME-SAP) to a network layer 1318. This network layer may provide one or more functions, such as: routing management, reflector management and/or network-layer security management.

Furthermore, network layer 1318 may have layer interfaces 1320 (e.g., network layer data entity SAP or NLDE-SAP, or a network layer managed entity SAP or NLME-SAP) to an application support layer 1322. This application support layer may provide one or more functions, such as: message management, fragmentation management, discovery management and/or application security.

Additionally, network layer 1318 and application support layer 1322 may have layer interface 1324 (e.g., a security service provider interface) to security service provider 1326.

Moreover, application support layer 1322 may have layer interfaces 1328 (e.g., application support layer data SAP of ASLD-SAP, or application support layer managed SAP or ASLM-SAP) to endpoint multiplexing layer 1330. This endpoint multiplexing layer may route traffic to different destinations or endpoints (such as one of application objects 1332 or ZigBee network manager 1334) via endpoint interfaces 1336.

Note that ZigBee network manager 1334 may provide one or more functions, such as: device management, security management, binding management and/or network management. Notably, ZigBee network manager 1334 may: controls adaptive channel change; ensure a personal area network (PAN) including that sleepy end-devices (with a low rate of communication) move with a ZigBee gateway to a new channel, which may be set in software, as described further below); and/or provides an application programming interface for installing a channel blank map (e.g., from software, as described further below).

Moreover, ZigBee network manager 1334 may provide a software coexistence feature. This software coexistence feature may: install a channel blank map for ZigBee network manager 1334 driven by WLAN channel events; blank selected channels under an IEEE 802.11 distributed system service (DSS) envelope (which may include, e.g., five guard channels on ZigBee) for ZigBee and narrow-band (e.g., single-channel connected) BLE traffic; and/or may reuse the architecture for the same capabilities in BLE narrow band negotiation. Note that the software coexistence feature may not support frequency separation for beacons. However, BLE adaptive frequency hopping may support this capability.

Figure 14:
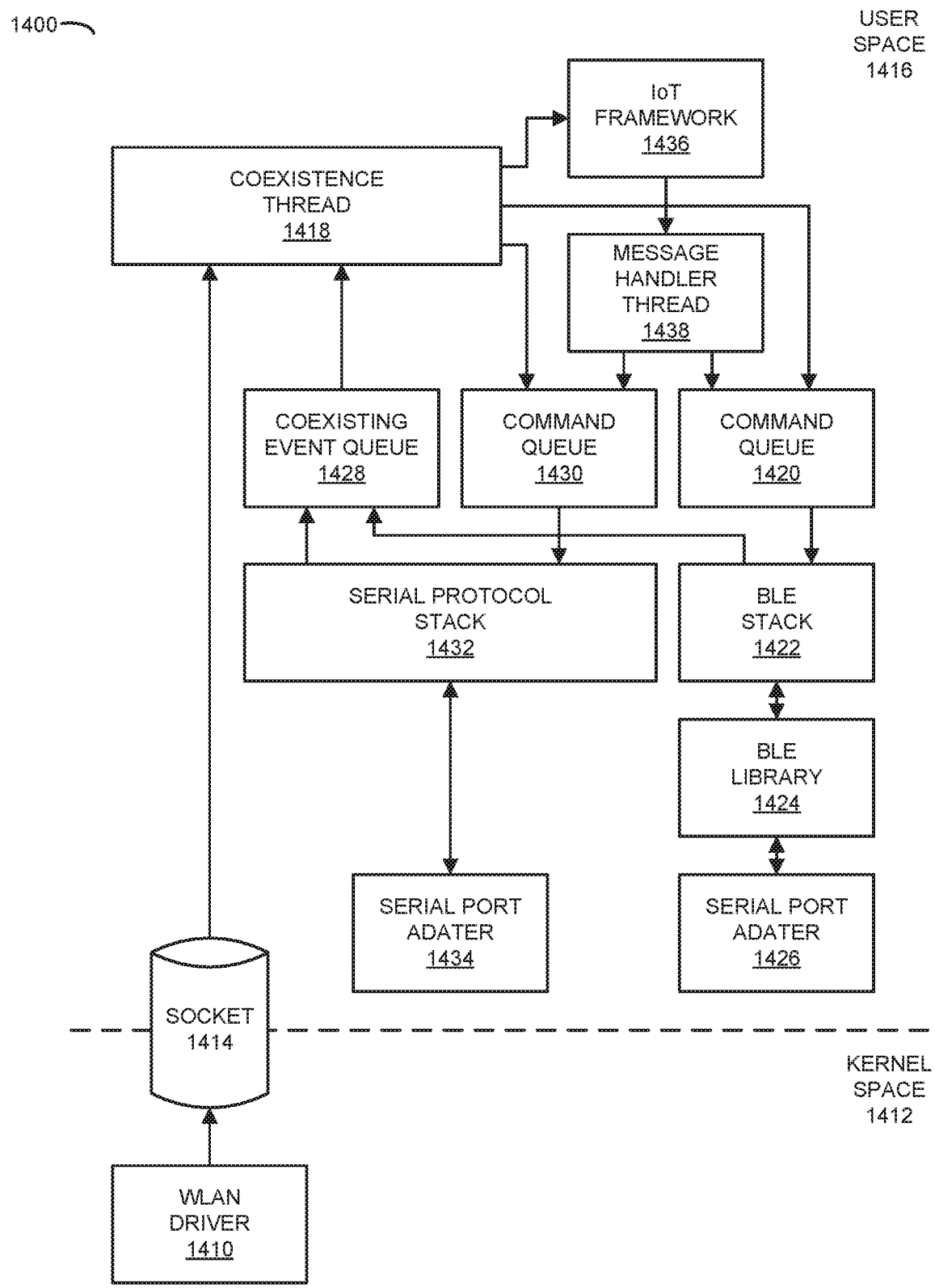
FIG. 14 is a drawing illustrating an example of a services-manager architecture in accordance with an embodiment of the present disclosure.

The software coexisting feature is further illustrated in FIG. 14, which presents a drawing illustrating an example of a services-manager architecture 1400 in accordance with an embodiment of the present disclosure. Notably, a WLAN driver 1410 in a Kernel space 1412 may publish a channel change event via a socket 1414. For example, WLAN driver 1410 may provide information, such as Wi-Fi status, channel number, and width.

Then, in a user space 1416, a coexistence thread 1418 (such as a Wi-Fi-ZigBee-BLE coexistence thread) may process the channel change indication, and may send a BLE coexistence message to a command queue 1420 (such as a BLE command queue). This BLE coexistence message may request detection of an overlap of BLE and Wi-Fi (such as a channel and a width).

After receiving the BLE coexistence message, command queue 1420 may provide it to BLE stack 1422, which may access a BLE library 1424 and/or kernel space 1412 via a serial port adapter 1426. Moreover, in response, BLE stack 1422 may provide a BLE adaptive frequency hopping mask update process status to coexisting event queue 1428, which provides this information to coexistence thread 1418.

Next, coexistence thread 1418 sends a ZigBee coexistence message (such as a ZigBee channel change) to command queue 1430 (such as a ZigBee command queue). After receiving the ZigBee channel change, command queue 1430 may provide it to serial protocol stack 1432, which may access kernel space 1412 via a serial port adapter 1434. Moreover, in response, serial protocol stack 1432 may provide a ZigBee channel change process status to coexistence event queue 1428, which provides this information to coexistence thread 1418.

Furthermore, coexistence thread 1418 may publish a coexistence status, e.g., via MQTT and an IoT framework 1436 (which provides a reporting messaging framework), to a message handler thread 1438. This message handler thread may provide the coexistence status to command queues 1420 and 1430.

Note that in services-manager architecture 1400 a public key and a command line interface (CLI) command may be used to configure an HT20 (or 20 MHz) mode in a 2.4 GHz band of frequencies. Moreover, IoT framework 1436 may configure the default value.

In some embodiments, when wireless communication protocols share crowded unlicensed bands of frequencies (such as in the 2.4 GHz Wi-Fi band of frequencies), there may be congestion and interference on physical and upper layers of the data communication protocols for assured or even available packet delivery. Moreover, in a multi-network-element enterprise deployment, there are typically groups of access points with multiple radios (even on the same access points) that are transmitting and receiving by parallel radio stacks and antenna systems. These communications may share the same band of frequencies.

While communication techniques can be used to mitigate cross-radio interference and to provide a reasonable coexistence on the same bands of frequencies, these approaches often do not provide exhaustive coexistence control for IoT and Wi-Fi with a high quality for mission-critical enterprise networks. Notably, these communication techniques may be included in communication protocols, such as: frequency or time-domain coordination, e.g., in adaptive frequency hopping (AFH), mobile wireless standards (MWS) or slot availability mask (SAM) in Bluetooth version 5.0. However, these approaches may attempt to reduce or mitigate interference by providing time or frequency separation for some communication protocols, components and/or versions. For example, adaptive frequency hopping may address interference for BLE version 5.0, but may not address legacy BLE communication. Moreover, adaptive frequency hopping typically is used when more than 15 auxiliary beacon channels are configured.

Moreover, while hardware solutions, such as radio-frequency isolation, low-level transmitter synchronization (such as e.g. using a 3-wire packet traffic arbiter), etc., provide some mitigation, there are usually product configurations in which these communication techniques may not be applicable (such as a pluggable multi-radio system with USB-extendable radio modules, which may not be designed against a particular model and which may not provide full availability of low-level hardware-wiring-based radio coordination).

Furthermore, these communication techniques may have categorizations, such as unmanaged and managed coexistence techniques, but even when used together they often leave gaps for practical use cases. Note that one category of communication techniques for coexistence is frequency separation, in which a set of radios coordinate not to transmit/receive on the same frequency. This category may be more feasible for a pluggable multi-radio system because these communication techniques may be easier to implement on upper levels of a system (such as a services manager), e.g., with signaling over a USB interface. This capability may be important for this problem, because coexistence frequency separation for legacy communication protocols or communication protocols with certain settings may not currently be supported on pluggable multi-radio systems.

The disclosed communication techniques provide an exhaustive solution for for coexistence frequency separation for legacy communication protocols or new communication protocols with unsupported settings in a pluggable multi-radio system in which tight radio design is not feasible. These disclosed communication techniques may fill the gaps in other approaches and may enable the quality that can be achieved with a network of coordinated modules in a pluggable multi-radio system.

Notably, in the disclosed communication techniques there may be modules on the Wi-Fi and the IoT side (such as BLE or ZigBee) that are aware of the current frequency and time domain of the local radio traffic. This capability may be a function of the management and/or monitoring of the local settings of the local radio traffic on a radio to which a module belongs. These modules may communicate in a one-way (unidirectional) or two-way (bidirectional) event-driven communication channel. For example, the event-driven communication channel may be one-way if the sending party has an absolute priority. Alternatively, the event-driven communication channel may be two-way if the priority can alternate between the radio transports. This latter approach may allow more than two participants.

Note that when either side (re)starts or experiences a change in the controlled traffic pattern (e.g., channel(s) used and/or in a frequency-range or envelope-width of the radio transmission), they may inform the peer modules of this change. Moreover, the modules may have a policy in which, e.g., frequency-domain avoidance is performed. For example, Wi-Fi may have priority and other traffic (associated with one or more other communication protocols) may avoid the frequency range of Wi-Fi (e.g., a portion of a band of frequencies used by Wi-Fi) plus an adequate guard-frequency or guard-channel distance from the traffic. Furthermore, the policy may dictate that a change is immediate or happens in a scheduled manner, e.g., with a delay or on weekdays.

Once a receiving module determines, based at least in part on the received information, policy and its local configuration, that there is a need to perform a change, it may locally move traffic, e.g., of a ZigBee gateway, a ZigBee PAN, etc., to another channel. This communication may be coordinated so that it spans radios local to a modular pluggable multi-radio system, or the radios on distinct physical electronic devices in a distributed system. Note that the coordination may be distributed, e.g., to receivers of the communication that make independent decisions from each other, or via a centralized coordinator that calculates the changes of settings for a wireless network.

For example, in a 3-way network (with Wi-Fi, ZigBee, and BLE) the current priority, channel/frequency operating ranges, adequate signal strengths, traffic classes (in terms of which traffic is or is not important) for each of the communication protocols may be used as parameters to determine which radio moves and which stays. This decision can made in a distributed manner or by a central coordinator in order to achieve frequency separation for a local wireless network or for the network-wide use case.

In some embodiments, the disclosed communication techniques may be used separately from or in conjunction with one or more other coexisting communication techniques (such as AFM, MWS and/or SAM).

The disclosed communication techniques may consistently provide improved or optimal coexistence performance across a system. This capability may allow a provider of the services manager to promise or guarantee performance, such as in a service level agreement. Moreover, the disclosed communication techniques may adapt channel blanking to a multi-faceted policy that is not only local, but is distributed. Therefore, the disclosed communication techniques may, via distributed coordination, extend the input to channel blanking and frequency or time-domain change to include remote radios and electronic devices (and, thus, may not be restricted to radios co-located to one fixed or one pluggable multi-radio system). While the preceding discussion used Wi-Fi, BLE and ZigBee as illustrative examples, in other embodiments different or additional communication protocols may be used with the disclosed communication techniques.

In some embodiments, the disclosed communication techniques may optimize the use of spectrum with BLE by providing radio coexistence management. Notably, a distributed system of access points and BLE radios may communicate to provide real-time location tracking. For example, the system may include trackable tags (such as BLE beacons) and one or more IoT access-point gateways (such as hundreds of trackable tags per access point). The communication techniques may be used to manage a 2.4 GHz band of frequencies for BLE and Wi-Fi communication (which may use a 20 MHz channel) in a crowded wireless environment.

As discussed previously, an IoT controller (such as the services manager) may provide a controlled mode of communication. The IoT controller may aggregate BLE beacons from BLE tags, including the frequencies of the beacons and the RSSIs received by one or more access points. A vendor may use this information to, e.g., allow visitors to be tracked via tokenized identifiers. However, in order to maintain system performance, the number of packets that are processed may be limited using a distributed filter in one or more access points and/or the IoT controller. Moreover, the IoT controller may coordinate the beacons that are presented, so that only interesting traffic is considered by the vendor.

For example, the IoT controller may use real-time location tracking to order messages. Notably, the IoT controller may take the beacons or messages with the top-3 RSSI values to compute a location using trilateration and/or or triangulation. The IoT controller may buffer the beacons, rank them, and the discard a percentage of the beacons (e.g., keeping the top 3).

Alternatively, the IoT controller may use a time window to filter which beacons are passed or provided to the vendors. For example, a 30 s time limit based on a current location may be used to filter beacons that are of interest). This may allow IoT controller to discard cross traffic.

In some embodiments of the communication techniques, the IoT controller may facilitate coexistence of different communication protocols. For example, a BLE tag may provide beacons. This BLE tag may hop to three evenly spaced beacon frequencies in a spectrum of a band of frequencies. If Wi-Fi is using a lower portion of the band of frequencies, the IoT controller may instruct the BLE beacon to cease using one of the three frequencies for BLE. This change may improve efficiency (e.g., it may make the system more responsive to service requests, because only two frequencies may be used). Alternatively or additionally, the BLE beacon may adapt the frequencies of the beacons using adaptive frequency hopping. In some embodiments, the IoT controller may use in-line and out-of-line data to aggregate traffic, coordinate traffic, provide physical layer optimization and/or content-based optimization.

These capabilities may allow electronic devices and access points to use the same channels or bands of frequencies while reducing or eliminating interference. This may allow the system to be scaled to a large number of electronic devices and access points.

Figure 15:
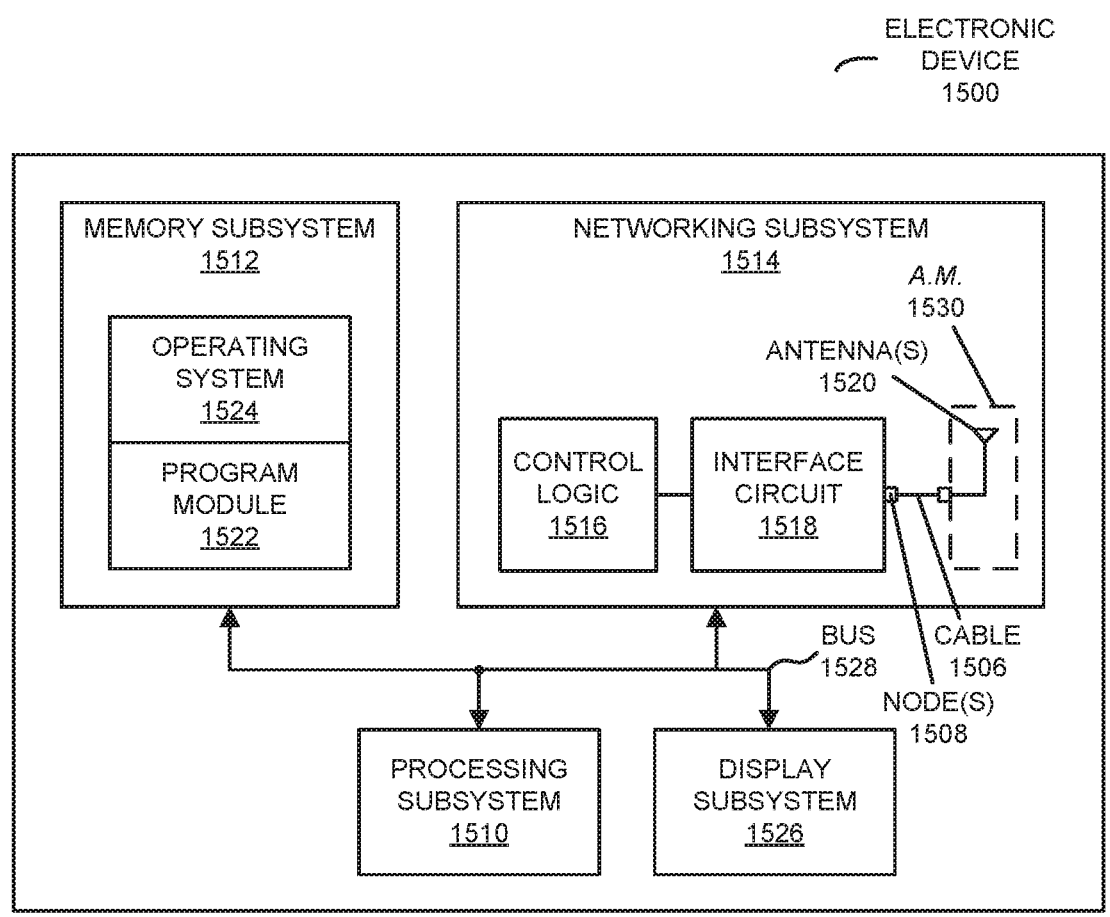
FIG. 15 is a block diagram illustrating an example of an electronic device in accordance with an embodiment of the present disclosure.

We now describe embodiments of an electronic device, which may perform at least some of the operations in the communication techniques. FIG. 15 presents a block diagram illustrating an example of an electronic device 1500 in accordance with some embodiments, such as one of access points 110, electronic devices 112, services manager 114 or computers 116. This electronic device includes processing subsystem 1510, memory subsystem 1512, and networking subsystem 1514. Processing subsystem 1510 includes one or more devices configured to perform computational operations. For example, processing subsystem 1510 can include one or more microprocessors, ASICs, microcontrollers, programmable-logic devices, one or more graphics processing units, and/or one or more digital signal processors (DSPs).

Memory subsystem 1512 includes one or more devices for storing data and/or instructions for processing subsystem 1510 and networking subsystem 1514. For example, memory subsystem 1512 can include dynamic random access memory (DRAM), static random access memory (SRAM), and/or other types of memory. In some embodiments, instructions for processing subsystem 1510 in memory subsystem 1512 include: one or more program modules or sets of instructions (such as program instructions 1522 or operating system 1524), which may be executed by processing subsystem 1510. Note that the one or more computer programs or program instructions may constitute a computer-program mechanism. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), including: control logic 1516, an interface circuit 1518, an optional cable 1506 and one or more antennas 1520 (or antenna elements), which may be included in an optional antenna module 1530. (While FIG. 15 includes antenna module 1530, in some embodiments electronic device 1500 includes one or more nodes, such as nodes 1508, e.g., a pad, which can be coupled to antenna module 1530. Thus, electronic device 1500 may or may not include antenna modules 1530. Note that the one or more nodes 1508 may constitute input(s) to and/or output(s) from electronic device 1500.) For example, networking subsystem 1514 can include a Bluetooth™ networking system, a BLE networking system, a cellular networking system (e.g., a 3G/4G/5G network such as UMTS, LTE, etc.), a universal serial bus (USB) networking system, a networking system based at least in part on the standards described in IEEE 802.11 (e.g., a Wi-Fi® networking system), an Ethernet networking system, a Zigbee networking system, a Z-Wave networking system, a LoRaWAN networking system and/or another networking system.

Note that a transmit or receive antenna pattern (or antenna radiation pattern) of electronic device 1500 may be adapted or changed using pattern shapers (such as reflectors) in one or more antennas 1520 (or antenna elements), which can be independently and selectively electrically coupled to ground to steer the transmit antenna pattern in different directions. Thus, if one or more antennas 1520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices as described previously.

Within electronic device 1500, processing subsystem 1510, memory subsystem 1512, and networking subsystem 1514 are coupled together using bus 1528. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/ or electro-optical connections among the subsystems.

In some embodiments, electronic device 1500 includes a display subsystem 1526 for displaying information on a display, which may include a display driver and the display, such as a liquid-crystal display, a multi-touch touchscreen, etc.

Electronic device 1500 can be (or can be included in) any electronic device with at least one network interface. For example, electronic device 1500 can be (or can be included in): an IoT device, a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments some or all of a given subsystem or component can be integrated into one or more of the other subsystems or component(s) in electronic device 1500. For example, in some embodiments program instructions 1522 is included in operating system 1524 and/or control logic 1516 is included in interface circuit 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1514. The integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/ or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used BLE, Ethernet, MQTT and a Wi-Fi communication protocols as illustrative examples, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1522, operating system 1524 (such as a driver for interface circuit 1518) or in firmware in interface circuit 1518. Note that the communication techniques may occur while processing system 1510 executes program instructions 1522. Thus, the communication techniques may be implemented at runtime of program instructions 1522. Alternatively or additionally, at least some of the operations in the communication techniques may be implemented in a physical layer, such as hardware in interface circuit 1518.

Moreover, while the preceding discussion illustrated embodiments of the communication techniques in which an access point transmits to or receives a frame or a packet from an electronic device, in some embodiments the access point may concurrently transmit to or receive frames or packets from two or more electronic devices. For example, the communication protocol in a WLAN may use orthogonal frequency division multiple access (OFDMA).

Furthermore, the functionality of electronic device 1500 may be implemented using a single electronic device or a group of electronic devices, which may be located at a single location or which may be distributed at disparate geographic locations (such as a cloud-based computing system).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a network node;
an interface circuit communicatively coupled to the network node;
a processor coupled to the interface circuit; and
memory, coupled to the processor, configured to store program instructions, wherein, when executed by the processor, the program instructions cause the electronic device to perform operations, comprising:
receiving, at the interface circuit, messages with beacon information for a communication protocol sourced from one or more gateways, wherein the beacon information is associated with a second electronic device, and wherein the beacon information in a given message comprises a frequency of a given beacon and a given received signal strength of the given beacon; and
providing, from the interface circuit, an instruction addressed to the second electronic device, wherein the instruction comprises a restriction for causing the second electronic device to restrict frequencies of beacons from the second electronic device based at least in part on a band of frequencies associated with a second communication protocol used by at least one of the one or more gateways.

2. The electronic device of claim 1, wherein the restriction causes the second electronic device to eliminate beacons having one of the beacon frequencies that overlaps the band of frequencies.

3. The electronic device of claim 1, wherein the communication protocol comprises Bluetooth low energy (BLE).

4. The electronic device of claim 1, wherein the second communication protocol comprises an Institute of Electrical and Electronics Engineers (IEEE) 802.11 communication protocol.

5. The electronic device of claim 1, wherein the one or more gateways comprise an access point or an eNodeB.

6. The electronic device of claim 1, wherein the operations comprise providing one or more instructions addressed to the second electronic device; and
wherein the one or more instructions comprise commands to prevent at least one of the gateways, the second electronic device or both from locally selecting and transmitting on an overlapping frequency.

7. The electronic device of claim 1, wherein the operations comprise providing one or more instructions addressed to at least the one of the gateways or the second electronic device; and
wherein the one or more instructions indicate that the communication protocol or the second communication protocol are to be terminated on a current channel and the communication protocol or the second communication protocol are to be relocated to another channel.

8. The electronic device of claim 1, wherein the operations comprise providing one or more instructions addressed to multiple instances of the second electronic device and
wherein the one or more instructions indicate that the multiple instances of the second electronic devices are to terminate their communications on their current channels and are to relocate the communication protocol or the second communication protocol to other channels where no two channels overlap.

9. The electronic device of claim 1, wherein the operations comprise providing one or more instructions addressed to multiple instances of the second electronic device; and
wherein the one or more instructions indicate that the multiple instances of the second electronic devices are to terminate their communications on their current channels and are to relocate the communication protocol or the second communication protocol to other channels where overlap by the multiple instances of the second electronic device on each channel are evenly distributed.

10. The electronic device of claim 1, wherein the operations comprise providing one or more instructions addressed to multiple instances of the second electronic device; and
wherein the one or more instructions indicate that the multiple instances of the second electronic devices are to terminate their communications on their current channels and are to relocate the communication protocol or the second communication protocol to other channels where average minimum physical distance of multiple instances of the second electronic device on a given channel is to be maximized based at least in part on known or predetermined locations of the multiple instances of the second electronic device.

11. A non-transitory computer-readable storage medium for use in conjunction with an electronic device, the computer-readable storage medium storing program instructions that, when executed by the electronic device, coordinates frequencies of coexisting communication protocols by causing the electronic device to perform operations comprising:

receiving messages with beacon information for a communication protocol sourced from one or more gateways, wherein the beacon information is associated with a second electronic device, and wherein the beacon information in a given message comprises a frequency of a given beacon and a given received signal strength of the given beacon; and providing an instruction addressed to the second electronic device, wherein the instruction comprises a restriction for causing the second electronic device to restrict frequencies of beacons from the second electronic device based at least in part on a band of frequencies associated with a second communication protocol used by at least one of the one or more gateways.

12. The non-transitory computer-readable storage medium of claim 11, wherein the restriction causes the second electronic device to eliminate beacons having one of the beacon frequencies that overlaps the band of frequencies.

13. The non-transitory computer-readable storage medium of claim 11, wherein the communication protocol comprises Bluetooth low energy (BLE).

14. The non-transitory computer-readable storage medium of claim 11, wherein the second communication protocol comprises an Institute of Electrical and Electronics Engineers (IEEE) 802.11 communication protocol.

15. The non-transitory computer-readable storage medium of claim 11, wherein the one or more gateways comprise an access point or an eNodeB.

16. A method for coordinating frequencies of coexisting communication protocols, comprising:

by an electronic device:

receiving messages with beacon information for a communication protocol sourced from one or more gateways, wherein the beacon information is associated with a second electronic device, and wherein the beacon information in a given message comprises a frequency of a given beacon and a given received signal strength of the given beacon; and providing an instruction addressed to the second electronic device, wherein the instruction comprises a restriction for causing the second electronic device to restrict frequencies of beacons from the second electronic device based at least in part on a band of frequencies associated with a second communication protocol used by at least one of the one or more gateways.

17. The method of claim 16, wherein the restriction causes the second electronic device to eliminate beacons having one of the beacon frequencies that overlaps the band of frequencies.

18. The method of claim 16, wherein the communication protocol comprises Bluetooth low energy (BLE).

19. The method of claim 16, wherein the second communication protocol comprises an Institute of Electrical and Electronics Engineers (IEEE) 802.11 communication protocol.

20. The method of claim 16, wherein the one or more gateways comprise an access point or an eNodeB.

* * * * *